United States Patent
Krishnamachari et al.

(10) Patent No.: US 12,250,011 B2
(45) Date of Patent: Mar. 11, 2025

(54) ACCESS POINTS HAVING CONFIGURABLE RADIO ARCHITECTURES

(71) Applicant: Ruckus IP Holdings LLC, Claremont, NC (US)

(72) Inventors: Anand Krishnamachari, Campbell, CA (US); Rajesh Koganti, Santa Clara, CA (US); Deepak Tripathi, Fremont, CA (US)

(73) Assignee: Ruckus IP Holdings LLC, Claremont, NC (US)

( * ) Notice: Subject to any disclaimer, the term of this patent is extended or adjusted under 35 U.S.C. 154(b) by 360 days.

(21) Appl. No.: 17/836,071

(22) Filed: Jun. 9, 2022

(65) Prior Publication Data

US 2022/0399909 A1 Dec. 15, 2022

Related U.S. Application Data

(60) Provisional application No. 63/209,130, filed on Jun. 10, 2021.

(51) Int. Cl.
*H04B 1/00* (2006.01)
*H04B 1/04* (2006.01)

(52) U.S. Cl.
CPC ......... *H04B 1/0057* (2013.01); *H04B 1/0078* (2013.01); *H04B 1/04* (2013.01)

(58) Field of Classification Search
CPC ....... H04B 1/0057; H04B 1/0078; H04B 1/04
USPC ....................................... 455/552.1
See application file for complete search history.

(56) References Cited

U.S. PATENT DOCUMENTS

| | | | |
|---|---|---|---|
| 11,356,133 B1* | 6/2022 | Hasnain | H04L 25/022 |
| 2003/0022652 A1* | 1/2003 | Stepp | H04B 1/406 |
| | | | 455/323 |
| 2011/0175789 A1 | 7/2011 | Lee et al. | |
| 2015/0295602 A1 | 10/2015 | Lo et al. | |
| 2016/0081092 A1 | 3/2016 | Akhavan-Saraf et al. | |
| 2017/0215210 A1* | 7/2017 | Lipowski | H04W 76/10 |
| 2018/0294858 A1 | 10/2018 | Pehlke | |
| 2019/0082497 A1 | 3/2019 | Friedmann et al. | |
| 2019/0222997 A1* | 7/2019 | Reshef | H04W 52/50 |
| 2019/0261352 A1* | 8/2019 | Cariou | H04L 5/0053 |
| 2020/0007265 A1* | 1/2020 | Min | H04L 1/0003 |
| 2020/0137690 A1* | 4/2020 | Min | H04W 52/0229 |
| 2020/0145895 A1* | 5/2020 | Dash | H04W 40/246 |
| 2020/0413491 A1 | 12/2020 | Ansley et al. | |
| 2021/0067186 A1 | 3/2021 | Beaudin et al. | |
| 2021/0184707 A1* | 6/2021 | Hasnain | H04B 1/0053 |
| 2021/0329500 A1* | 10/2021 | Cariou | H04W 74/002 |
| 2021/0377947 A1* | 12/2021 | Changlani | H04W 48/16 |
| 2022/0014165 A1* | 1/2022 | Cai | H03H 9/703 |
| 2022/0029649 A1* | 1/2022 | Epstein | H04B 1/1607 |
| 2022/0225152 A1* | 7/2022 | Schultz | H04W 72/51 |

OTHER PUBLICATIONS

"PCT Search Report and Written Opinion in corresponding patent application No. PCTU.S. Pat. No. 2230618 mailed Aug. 30, 2022, 22 pages".

* cited by examiner

*Primary Examiner* — Mark G. Pannell
(74) *Attorney, Agent, or Firm* — Myers Bigel, P.A.

(57) ABSTRACT

An access point includes a WiFi chipset, a first radio that is coupled to the WiFi chipset and that is selectively coupled to a first radiating element through one of a first filter or a second filter, and a second radio that is coupled between the WiFi chipset and a second radiating element.

17 Claims, 14 Drawing Sheets

ACCESS POINTS HAVING CONFIGURABLE RADIO ARCHITECTURES

CROSS-REFERENCE TO RELATED APPLICATION

The present application claims priority under 35 U.S.C. § 119 to U.S. Provisional Patent Application Ser. No. 63/209,130, filed Jun. 10, 2021, the entire content of which is incorporated herein by reference.

BACKGROUND

The present invention generally relates to radio communications and, more particularly, to communications in wireless local area networks.

A wireless local area network ("WLAN") refers to a network that operates in a limited area (e.g., within a home, school, store, campus, shopping mall, etc.) that interconnects two or more electronic devices using wireless radio frequency ("RF") communications. Electronic devices belonging to users ("clients") of a WLAN, such as smartphones, computers, tablets, printers, appliances, televisions, lab equipment and the like (herein "client devices"), can communicate with each other and with external networks such as the Internet over the WLAN. Since wireless communications are used, portable client devices can be moved throughout the area covered by the WLAN and remain connected to the network. Most WLANs operate under a family of standards promulgated by the Institute of Electrical and Electronics Engineers (IEEE) that are referred to as the IEEE 802.11 standards. WLANs operating under the IEEE 802.11 family of standards are commonly referred to as WiFi networks. Client devices that include a networking subsystem that includes a WiFi network interface can communicate over WiFi networks.

A Win network includes one or more access points (also referred to as hotspots) that are typically installed at fixed locations throughout the area covered by the WiFi network. The WiFi network can include a single access point that provides coverage in a very limited area or may include tens, hundreds or even thousands of access points that provide in-building and/or outdoor coverage to a large campus or region. Client devices communicate with each other and/or with wired devices that are connected to the WiFi network through the access points. The access points may be connected to each other and/or to one or more controllers through wired and/or wireless connections. The Win network typically includes one or more gateways that may be used to provide Internet access to the client devices.

Early WiFi standards supported communication in the 2.401-2.484 GHz frequency range (herein "the 2.4 GHz frequency band"). Later WiFi standards supported communication in the 5.170-5.835 GHz frequency range (herein "the 5 GHz frequency band"). Most modern access points support communications in both the 2.4 GHz and 5 GHz frequency bands, and have a radio for each frequency band. Recently, the United States Federal Communications Commission voted to open spectrum in the 5.935-7.125 GHz frequency range, which is referred to herein as "the 6 GHz frequency band," for use in WiFi applications, and many other countries are likewise in the process of allowing WiFi networks to operate in the 6 GHz frequency band. Access points that support WiFi communications in the 6 GHz frequency band will include a total of three radios, namely one for each of the 2.4 GHz, 5 GHz and 6 GHz frequency bands.

SUMMARY

Pursuant to embodiments of the present invention, access points are provided that include a WiFi chipset, a first radio that is coupled to the WiFi chipset and that is selectively coupled to a first radiating element through one of a first filter or a second filter, and a second radio that is coupled between the WiFi chipset and a second radiating element.

In some embodiments, the first radio may be capable of operating in at least a first portion of the 5 GHz frequency band and in the 6 GHz frequency band, and the second radio may be capable of operating in the 5 GHz frequency band.

In some embodiments, the first filter may be a first bandpass filter that is configured to pass radio frequency ("RF") signals in the 6 GHz frequency band and the second filter may be a second bandpass filter that is configured to pass RF signals in a first sub-band of the 5 GHz frequency band that encompasses less than all of the full 5 GHz frequency band.

In some embodiments, the second radio may be selectively coupled to the second radiating element through one of a third filter or a fourth filter In some embodiments, the third filter may be a third bandpass filter that is configured to pass RF signals in the full 5 GHz frequency band and the fourth filter may be a fourth bandpass filter that is configured to pass RF signals in a second sub-band of the 5 GHz frequency band that encompasses less than all of the full 5 GHz frequency band.

In some embodiments, the first sub-band of the 5 GHz frequency band may not overlap with the second sub-band of the 5 GHz frequency band.

In some embodiments, the first radio may be configured to operate in either the full 5 GHz frequency band or the full 6 GHz frequency band, the second radio may be configured to operate in the full 5 GHz frequency band, the first filter may be a first bandpass filter that is configured to pass radio frequency ("RF") signals in the full 6 GHz frequency band and the second filter may be a bandpass filter that is configured to pass RF signals in the full 5 GHz frequency band.

In some embodiments, the access point may be configured to operate with N multi-input-multi-output ("MIMO") transmit/receive paths in the 5 GHz frequency band when the access point is supporting communications in the 6 GHz frequency band, and may be configured to operate with 2*N MIMO transmit/receive paths in the 5 GHz frequency band when the access point is not supporting communications in the 6 GHz frequency band.

In some embodiments, the access point may be configured to use both the first radio and the second radio to communicate using multi-input-multi-output ("MIMO") communications techniques in the 5 GHz frequency band when the access point is not supporting communications in the 6 GHz frequency band.

In some embodiments, a first switch may be interposed between the first radio and the first and second filters and a second switch may be interposed between the first and second filters and the first radiating element.

In some embodiments, a first switch may be interposed between the first radio and the first and second filters and a second switch may be interposed between the first and second filters and the first radiating element.

In some embodiments, a third switch may be interposed between the second radio and the third and fourth filters and a fourth switch may be interposed between the third and fourth filters and the second radiating element.

In some embodiments, the access point may further include a third radio that is configured to operate in the 2.4 GHz frequency band, wherein the second radio and the third radio are coupled to the second radiating element via a diplexer.

In some embodiments, the access point may further include an isolation circuit coupled along a communication path that extends between the second radio and the second radiating element.

In some embodiments, the isolation circuit may be a PIN diode that is configured to be selectively coupled to ground.

In some embodiments, the isolation circuit may be enabled only when the access point is configured to pass RF signals from the first radio to the first radiating element over a communication path that includes the second bandpass filter.

In some embodiments, the isolation circuit may be disabled when the access point is configured to pass RF signals from the first radio to the first radiating element over a communication path that includes the first bandpass filter.

In some embodiments, the second radio may be selectively coupled to the second radiating element through a first communication path that includes a third bandpass filter that is configured to pass RF signals in the full 5 GHz frequency band or through a second communication path that includes a fourth bandpass filter that is configured to pass RF signals in a sub-band of the 5 GHz frequency band that encompasses less than all of the full 5 GHz frequency band, and the isolation circuit may be coupled along the second communication path.

Pursuant to further embodiments of the present invention, access points are provided that include a first radio, a first radiating element, and a first transmit/receive path that is coupled between the first radio and the first radiating element, the first transmit/receive path selectively configurable to pass radio frequency ("RF") signals in either the 6 GHz frequency band or at least a portion of the 5 GHz frequency band.

In some embodiments, the access point may further include a second radio, a second radiating element, and a second transmit/receive path that is coupled between the second radio and the second radiating element, the second transmit/receive path selectively configurable to pass RF signals in either the full 5 GHz frequency band or in a first sub-band of the 5 GHz frequency band that encompasses less than all of the full 5 GHz frequency band.

In some embodiments, the access point may further include a third radio and a third transmit/receive path that is coupled between the third radio and the second radiating element, the third transmit/receive path configured to pass RF signals in the 2.4 GHz frequency band.

In some embodiments, the access point may further include a first bandpass filter that is configured to pass RF signals in the 6 GHz frequency band a second bandpass filter that is configured to pass RF signals in a first sub-band of the 5 GHz frequency band that encompasses less than all of the full 5 GHz frequency band, and a first pair of switches that are configured to selectively route RF signals traversing the first transmit/receive path through either the first bandpass filter or the second bandpass filter.

In some embodiments, the access point may further include a third bandpass filter that is configured to pass RF signals in the 5 GHz frequency band, a fourth bandpass filter that is configured to pass RF signals in a second sub-band of the 5 GHz frequency band that encompasses less than all of the full 5 GHz frequency band, and a second pair of switches that are configured to selectively route RF signals traversing the second transmit/receive path through either the third bandpass filter or the fourth bandpass filter. In such embodiments, the first sub-band of the 5 GHz frequency band may not overlap the second sub-band of the 5 GHz frequency band.

In some embodiments, the access point may be configured to use both the first radio and the second radio to communicate using multi-input-multi-output ("MIMO") communications techniques in the 5 GHz frequency band when the access point is not supporting communications in the 6 GHz frequency band.

In some embodiments, the access point may further include an isolation circuit coupled along the second transmit/receive path.

In some embodiments, the isolation circuit may be a PIN diode that is configured to be selectively coupled to ground.

In some embodiments, the access point may be configured to enable the isolation circuit only when the access point is configured to pass RF signals from the first radio to the first radiating element over a communication path that includes the second bandpass filter.

In some embodiments, the access point may be configured to disable the isolation circuit when the first pair of switches are configured to route RF signals traversing the first transmit/receive path through the first bandpass filter.

Pursuant to still further embodiments of the present invention, methods of operating an access point are provided. The access point may include at least a first radio, a second radio, a first radiating element and a second radiating element. Pursuant to these methods, the first radio is selectively configured to operate in either the 5 GHz frequency band or the 6 GHz frequency band, and RF signals from the first radio are selectively routed to the first radiating element through either a 6 GHz transmit/receive path or a first 5 GHz transmit/receive path based on the configuration of the first radio.

In some embodiments, these methods may further include selectively configuring the second radio to operate in either the full 5 GHz frequency band or a first sub-band of the 5 GHz frequency band that encompasses less than all of the full 5 GHz frequency band, and selectively routing RF signals from the second radio to the second radiating element through either a second 5 GHz transmit/receive path or a partial 5 GHz transmit/receive path based on the configuration of the second radio.

In some embodiments, the 6 GHz transmit/receive path may include a first bandpass filter that is configured to pass RF signals in the 6 GHz frequency band and the first 5 GHz transmit/receive path may include second bandpass filter that is configured to pass RF signals in a first sub-band of the 5 GHz frequency band that encompasses less than all of the full 5 GHz frequency band.

In some embodiments, the second 5 GHz transmit/receive path may include a third bandpass filter that is configured to pass RF signals in the full 5 GHz frequency band and the partial 5 GHz transmit/receive path may include a fourth bandpass filter that is configured to pass RF signals in a second sub-band of the 5 GHz frequency band that encompasses less than all of the full 5 GHz frequency band and that is different from the first sub-band of the 5 GHz frequency band. In some embodiments, the first sub-band of the 5 GHz frequency band may not overlap with the second sub-band of the 5 GHz frequency band.

In some embodiments, the access point may further include a third radio that is configured to operate in the 2.4 GHz frequency band, where the second radio and the third radio are coupled to the second radiating element via a diplexer.

In some embodiments, the access point may further include an isolation circuit coupled along the second 5 GHz transmit/receive path. In some embodiments, the isolation circuit may be a PIN diode that is configured to be selectively coupled to ground.

In some embodiments, the method may further include enabling the isolation circuit when the access point is configured to pass RF signals over the first 5 GHz transmit/receive path.

In some embodiments, the method may further include disabling the isolation circuit when the access point is configured to pass RF signals over the 6 GHz transmit/receive path.

BRIEF DESCRIPTION OF THE DRAWINGS

Like reference numerals refer to corresponding parts throughout the drawings. Moreover, multiple instances of the same part may be designated by a common prefix separated from an instance number by a dash.

DETAILED DESCRIPTION

Figure 1:
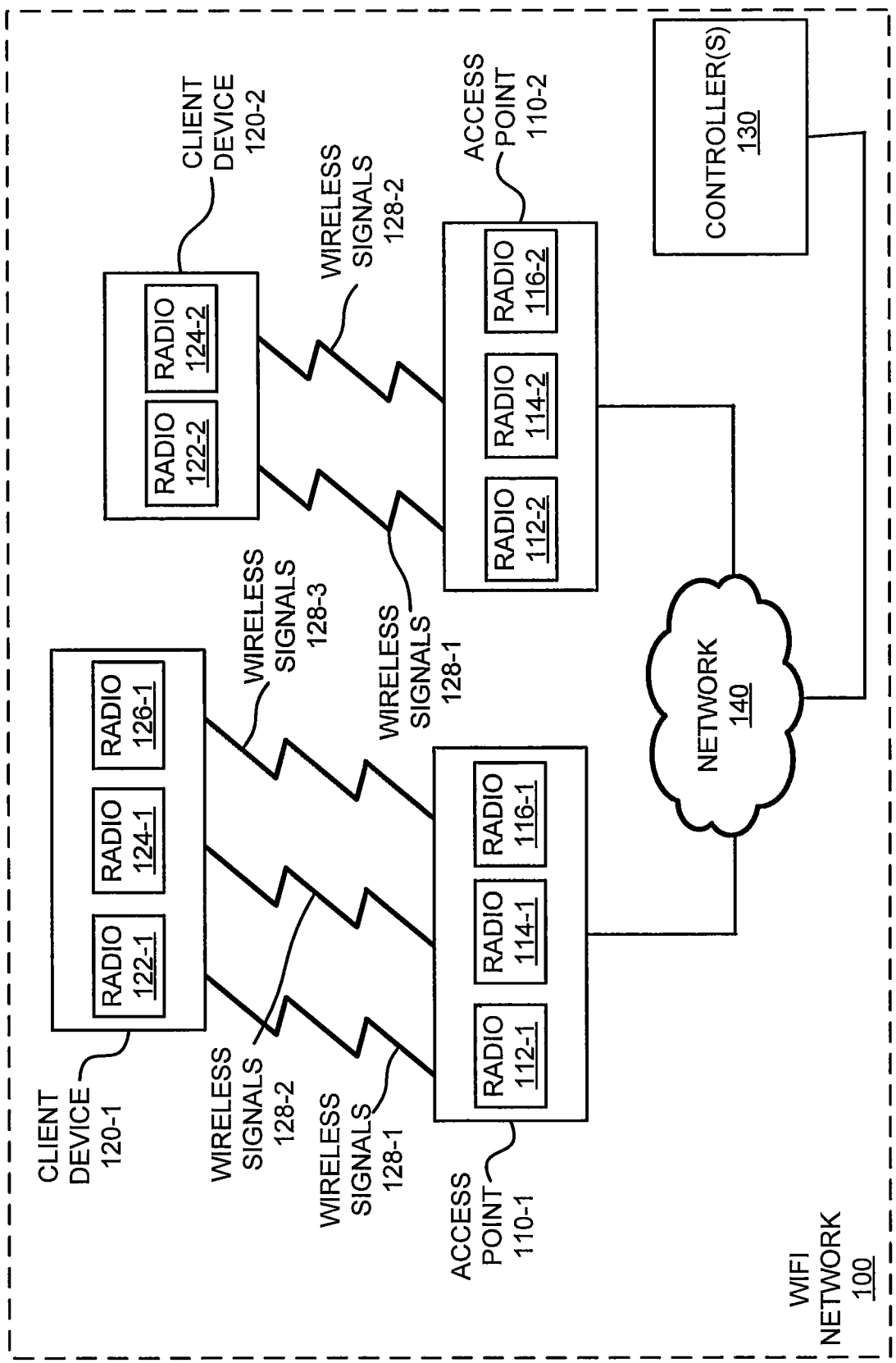
FIG. 1 is a block diagram illustrating an example of a simplified WiFi network in which the communication techniques according to embodiments of the present invention may be practiced.

As discussed above, WiFi networks are now authorized to operate in the 5.935-7.125 GHz frequency range, which is referred to herein as "the 6 GHz frequency band." With the opening of the 6 GHz frequency band for WiFi communications, so-called "tri-band" WiFi access points are being developed that will include a first radio that operates in the 2.401-2.484 GHz frequency range (herein "the 2.4 GHz frequency band"), a second radio that operates in the 5.170-5.835 GHz frequency range (herein "the 5 GHz frequency band") and a third radio that operates in the 6 GHz frequency band. In the United States, the 5.350-5.490 GHz frequency band is not available for WiFi communications. Herein, references to the "full" 5 GHz frequency band refer to at least the combination of the 5.170-5.335 and 5.490-5.835 GHz frequency ranges, and may also include the 5.350-5.490 GHz frequency range.

It is expected that the 6 GHz frequency band will be opened for WiFi service at different times in different countries. Moreover, even after the 6 GHz frequency band is made available in a given country for supporting WiFi service, many client devices will not include a 6 GHz radio and hence will not be able to operate in the 6 GHz frequency band. As a result, as tri-band access points are initially deployed, they often may not be associated with any clients that operate in the 6 GHz frequency band. In such cases, tri-band access points may have wasted capabilities that are not used, including the 6 GHz radio and related circuitry.

Pursuant to embodiments of the present invention, tri-band access points are provided which have a first radio that is configured to operate in the 2.4 GHz frequency band, a second radio that is configured to operate in the 5 GHz frequency band and a third radio that is configured (in hardware and/or software) to operate in either the 5 GHz frequency band or in the 6 GHz frequency band. These access points may be operated in two or more different modes. For example, a tri-band access point according to embodiments of the present invention may operate in a first mode where the first radio operates in the 2.4 GHz frequency band, the second radio operates in the 5 GHz frequency band, and the 6 GHz radio operates in the 6 GHz frequency band. The access point may alternatively operate in a second mode where the first radio operates in the 2.4 GHz frequency band, the second radio operates in a first sub-band of the 5 GHz frequency band, and the third radio operates in a second sub-band of the 5 GHz frequency band that is different than the first sub-band. For example, the first sub-band of the 5 GHz frequency band could be a lower portion of the frequency band (e.g., 5.170-5.350 GHz) and the second sub-band of the 5 GHz frequency band could be an upper portion of the frequency band (e.g., 5.490-5.835 GHz). As another example, in the second mode the first sub-band of the 5 GHz frequency band could be an upper portion of the frequency band (e.g., 5.490-5.835 GHz) and the second sub-band of the 5 GHz frequency band could be a lower portion of the frequency band (e.g., 5.170-5.350 GHz).

In some embodiments, the access point may be configured so that it can additionally operate in a third mode where the first radio operates in the 2.4 GHz frequency band, and the second and third radios both operate in the full 5 GHz frequency band. This third mode may be useful if the second and third radios can be operated in tandem to support higher order MIMO communications in the 5 GHz frequency band. In still other embodiments, the access point may be configured to operate in either the above-described first or third modes, but not the second mode.

In some embodiments, the access points according to embodiments of the present invention may include a filter bank for the 6 GHz radio and potentially for the 5 GHz radio as well. Each filter bank may include two or more filters and a selection circuit that can route RF signals through a selected one of the filters in the filter bank. The filters may be located between the respective radios and radiating elements of the access point.

When the access points according to embodiments of the present invention are operated in the above-described second mode, it may be difficult to maintain sufficient isolation between the transmit/receive paths operating in the respective upper and lower sub-bands of the 5 GHz frequency band. For example, leakage through switches that are included in the selection circuit may result in insufficient isolation between the upper and lower sub-bands of the 5 GHz frequency band, particularly in situations where a radio in one sub-band is transmitting at the same time that a radio in the other sub-band is receiving. In order to improve the isolation performance of the access point, isolation circuits may be provided along the communication paths that are coupled to the second (5 GHz) radio that include bandpass filters that pass the full 5 GHz frequency band. These isolation circuits may be selective activated when the access point operates in the second mode to improve isolation performance. The isolation circuits may be disabled when the access point operates in the first mode or the third mode.

In some embodiments, access points are provided that include a WiFi chipset, a first radio that is coupled to the WiFi chipset and that is selectively coupled to a first radiating element through one of a first filter or a second filter, and a second radio that is coupled between the WiFi chipset and a second radiating element. The first radio may be capable of operating in at least a first portion of the 5 GHz frequency band and in the 6 GHz frequency band, while the second radio is capable of operating in the 5 GHz frequency band. The first filter may be a first bandpass filter that is configured to pass RF signals in the 6 GHz frequency band and the second filter may be a second bandpass filter that is configured to pass RF signals in a first sub-band of the 5 GHz frequency band that encompasses less than all of the full 5 GHz frequency band.

The second radio may be selectively coupled to the second radiating element through one of a third filter or a fourth filter, where the third filter may be a third bandpass filter that is configured to pass RF signals in the full 5 GHz frequency band and the fourth filter may be a fourth bandpass filter that is configured to pass RF signals in a second sub-band of the 5 GHz frequency band that encompasses less than all of the full 5 GHz frequency band and that does not overlap with the first sub-band.

In other embodiments, access points are provided that include a first radio, a first radiating element, and a first transmit/receive path that is coupled between the first radio and the first radiating element. The first transmit/receive path may be selectively configurable to pass RF signals in either the 6 GHz frequency band or at least a portion of the 5 GHz frequency band. These access points may also include a second radio, a second radiating element, and a second transmit/receive path that is coupled between the second radio and the second radiating element. The second transmit/receive path may be selectively configurable to pass RF signals in either the full 5 GHz frequency band or in a first sub-band of the 5 GHz frequency band that encompasses less than all of the full 5 GHz frequency band. The access points may also include a first bandpass filter that is configured to pass RF signals in the 6 GHz frequency band, a second bandpass filter that is configured to pass RF signals in a first sub-band of the 5 GHz frequency band that encompasses less than all of the full 5 GHz frequency band, and a first pair of switches that are configured to selectively route RF signals traversing the first transmit/receive path through either the first bandpass filter or the second bandpass filter.

Pursuant to additional embodiments of the present invention, methods of operating an access point that has at least first and second radios and first and second radiating elements are provided. Pursuant to these methods, the first radio may be selectively configured to operate in either the 5 GHz frequency band or the 6 GHz frequency band. RF signals output from the first radio may then be selectively routed to the first radiating element through either a 5 GHz transmit/receive path or a 6 GHz transmit/receive path based on the configuration of the first radio. In some embodiments, the second radio may be selectively configured to operate in either the full 5 GHz frequency band or a first sub-band of the 5 GHz frequency band that encompasses less than all of the full 5 GHz frequency band, and RF signals output from the second radio may be selectively routed to the second radiating element through either a 5 GHz transmit/receive path or a 6 GHz transmit/receive path based on the configuration of the first radio.

Embodiments of the present invention will now be described in further detail with reference to the figures.

FIG. 1 is a block diagram illustrating a simplified WiFi network 100 in which the access points according to embodiments of the present invention may be used. As shown in FIG. 1, the WiFi network 100 may include one or more access points 110, one or more client devices 120 (such as cellular telephones, computers, tablets, printers and a wide range of other WiFi-capable electronic devices), and one or more optional controllers 130. The access points 110 may communicate with one or more of the client devices 120 using wireless communication that is compatible with an IEEE 802.11 standard. At least some of the access points 110 may be tri-band access points that include three access point radios. The access point radios may include first access point radios 112 that operate in the 2.4 GHz frequency band, second access point radios 114 that operate in the 5 GHz frequency band, and third access point radios 116 that are capable of operating in either the 5 GHz frequency band or the 6 GHz frequency band. The client devices 120 may also include one or more client radios 122, 124, 126. The client radios may include first client radios 122 that operate in the 2.4 GHz frequency band, second client radios 124 that operate in the 5 GHz frequency band, and third client radios 126 that operate in the 6 GHz frequency band. Some client devices 120 may only include less than all of the first, second and third client radios 122, 124, 126, as shown in FIG. 1 (i.e., client device 120-2 only includes a 2.4 GHz client radio 122-2 and a 5 GHz client radio 124-2).

The access points 110 may also communicate with the one or more optional controllers 130 via a network 140, which may comprise, for example, the Internet, an intra-net and/or one or more dedicated communication links. It will also be appreciated that some access points 110 may only be connected to the network 140 through other access points 110 (e.g., in a mesh network implementation). Note that the optional controllers 130 may be at the same location as the other components in WiFi network 100 or may be located remotely (e.g., cloud based controllers 130). The access points 110 may be managed and/or configured by the controllers 130. The access points 110 may communicate with the controller(s) 130 or other services using wireless communications and/or using a wired communication protocol, such as a wired communication protocol that is compatible with an IEEE 802.3 standard (which is sometimes referred to as "Ethernet"), e.g., an Ethernet II standard. The access points 110 may provide the client devices 120 access to the network 140. The access points 110 may be physical access points or may be virtual access points that are implemented on a computer or other electronic device. While not shown in FIG. 1, the WiFi network 100 may include additional components or electronic devices, such as, for example, a router.

The access points 110 and the client devices 120 may communicate with each other via wireless communication. The access points 110 and the client devices 120 may wirelessly communicate by: transmitting advertising frames on wireless channels, detecting one another by scanning wireless channels, exchanging subsequent data/management frames (such as association requests and responses) to establish a connection and configure security options (e.g., Internet Protocol Security), transmit and receive frames or packets via the connection, etc.

As described further below with reference to FIG. 14, the access points 110, client devices 120 and/or the controllers 130 may include subsystems, such as a networking subsystem, a memory subsystem and a processor subsystem. The networking subsystems of the access points 110 may include the above-described access point radios 112, 114, 116, and the networking subsystems of the client device 120 may include the above-described client radios 122, 124, 126.

As can be seen in FIG. 1, wireless signals 128-1 (represented by a jagged line) are transmitted from the 2.4 GHz radio 122-1 in client device 120-1. These wireless signals 128-1 are received by the 2.4 GHz radio 112-1 in at least one of the access points 110, such as access point 110-1. Likewise, wireless signals 128-2 are transmitted from the 5 GHz radio 124-1 in client device 120-1, and may be received by the 5 GHz radio 114-1 of access point 110-1, and wireless signals 128-3 are transmitted from the 6 GHz radio 126-1 in client device 120-1, and may be received by the 6 GHz radio 116-1 of access point 110-1. The wireless signals 128-1, 128-2, 128-3 may comprise frames or packets that are received by access point 110-1. It will be appreciated that wireless signals 128-1, 128-2, 128-3 may flow in both directions, namely from a client device 120 to an access point 110, and from an access point 110 to a client device 120.

The communication between client device 120-1 and access point 110-1 may be characterized by a variety of performance metrics, including, for example, a data rate, throughput (i.e., the data rate for successful transmissions), an error rate (such as a retry or resend rate), a signal-to-noise ratio, a ratio of number of bytes successfully communicated during a time interval to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

As discussed above, with the 6 GHz frequency band now available for WiFi communications, tri-band WiFi access points are being deployed that support WiFi communications in all three of the 2.4 GHz, 5 GHz and 6 GHz frequency bands. These tri-band access points may include three radios in order to support WiFi communications in the three different frequency bands. However, initially, there may be few client devices that support WiFi communications in the 6 GHz frequency band, and hence the 6 GHz radio may be underutilized. Additionally, access points may be deployed in jurisdictions where the 6 GHz frequency band is not currently available for WiFi communications, but may be in the future. In such jurisdictions, it may be desirable to deploy tri-band access points now so that the access points need not be replaced when WiFi communications are allowed in the 6 GHz band. However, before 6 GHz communications are authorized, the 6 GHz radio and associated circuitry will remain unused.

Pursuant to embodiments of the present invention, WiFi access points are provided that are configurable (in hardware or software) so that the 6 GHz radio may support communications in at least a portion of the 5 GHz frequency band. This may allow the access point to operate with two radios in the 5 GHz frequency band in deployments where communications in the 6 GHz frequency band are not authorized and/or in situations where there are few or no client devices that support WiFi communications in the 6 GHz frequency band.

Figure 2:
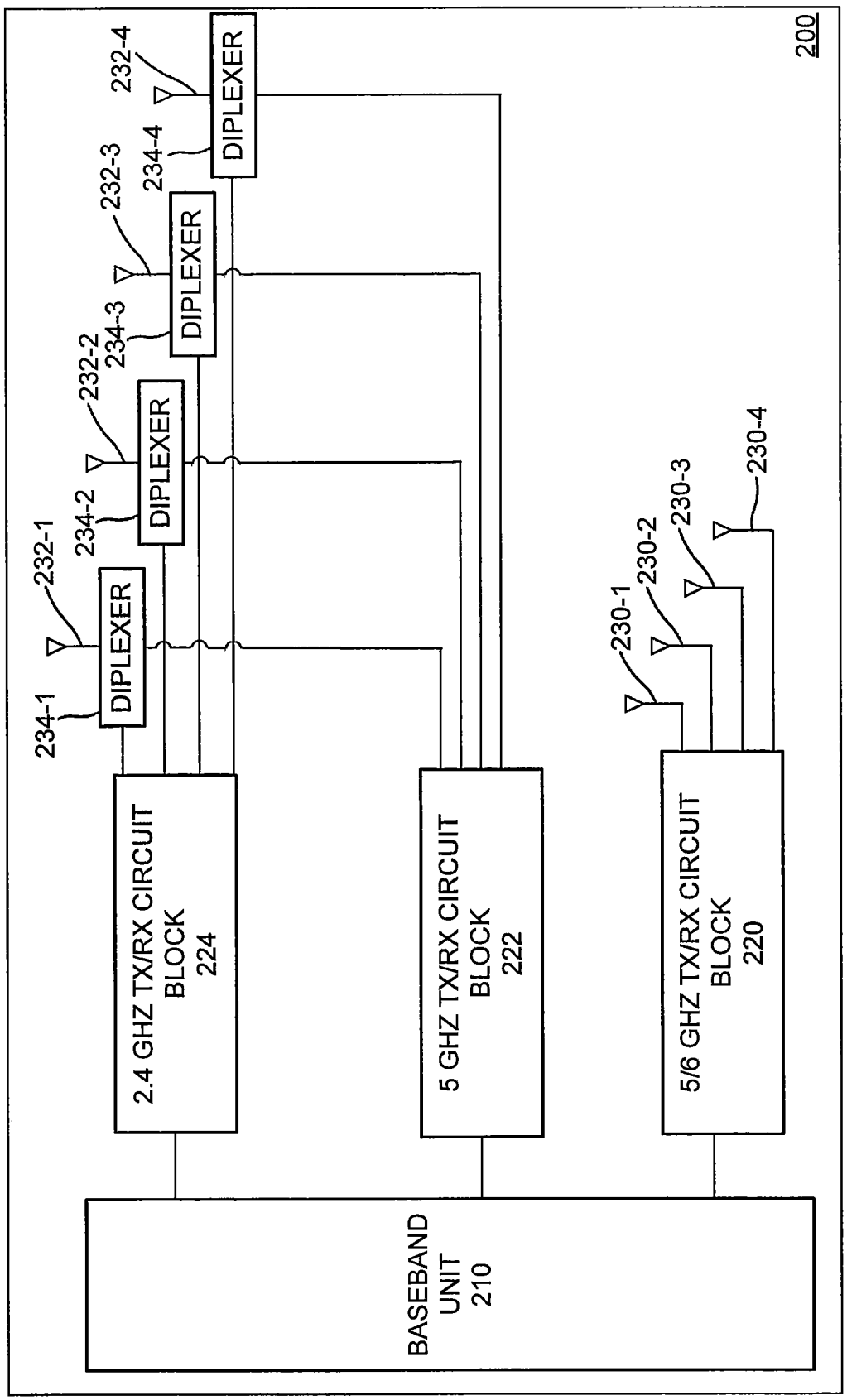
FIG. 2 is a block diagram of a tri-band access point according to embodiments of the present invention.
Figure 3:
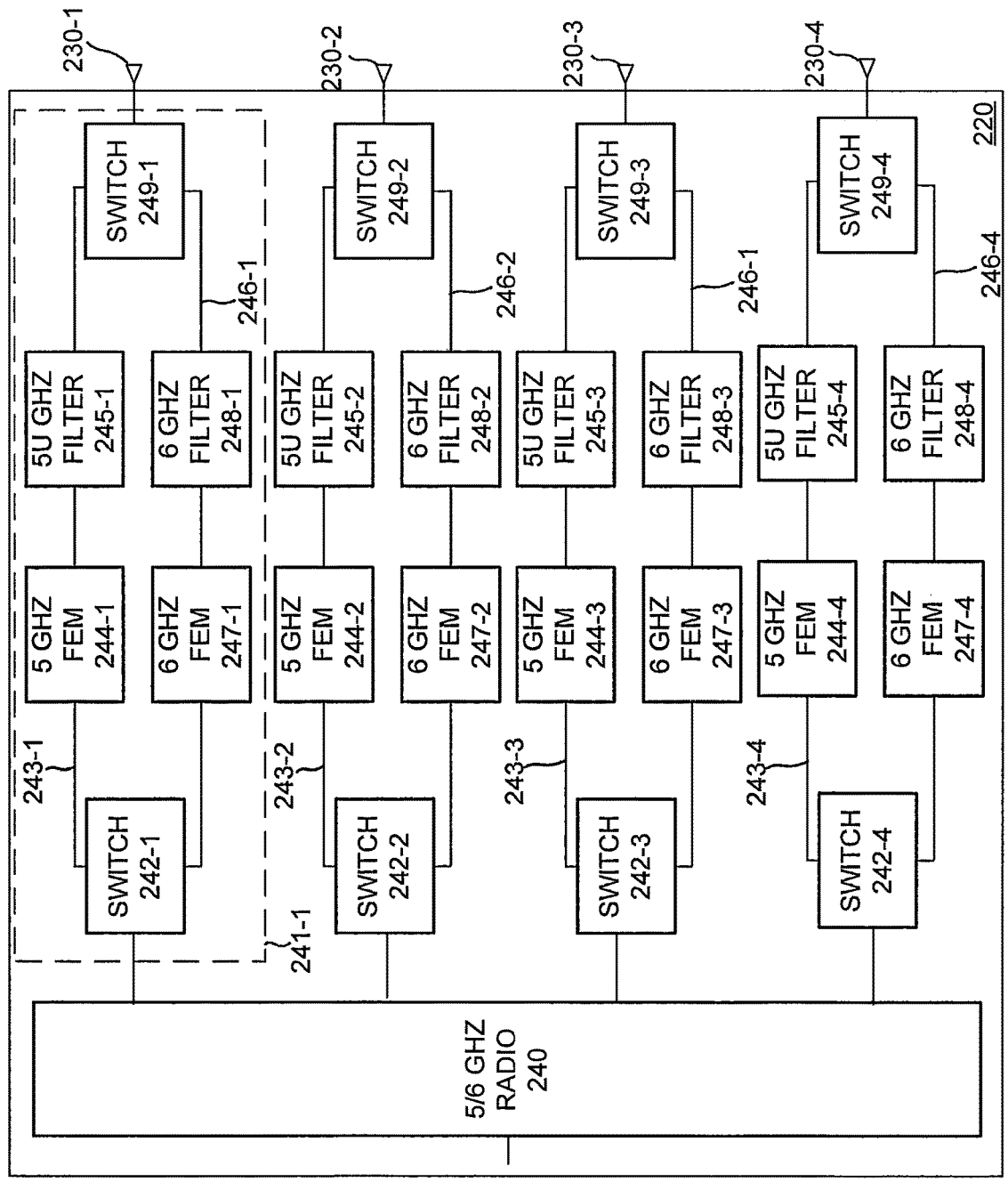
FIG. 3 is a more detailed block diagram of the 5/6 GHz transmit/receive circuit block of the tri-band access point of FIG. 2.
Figure 4:
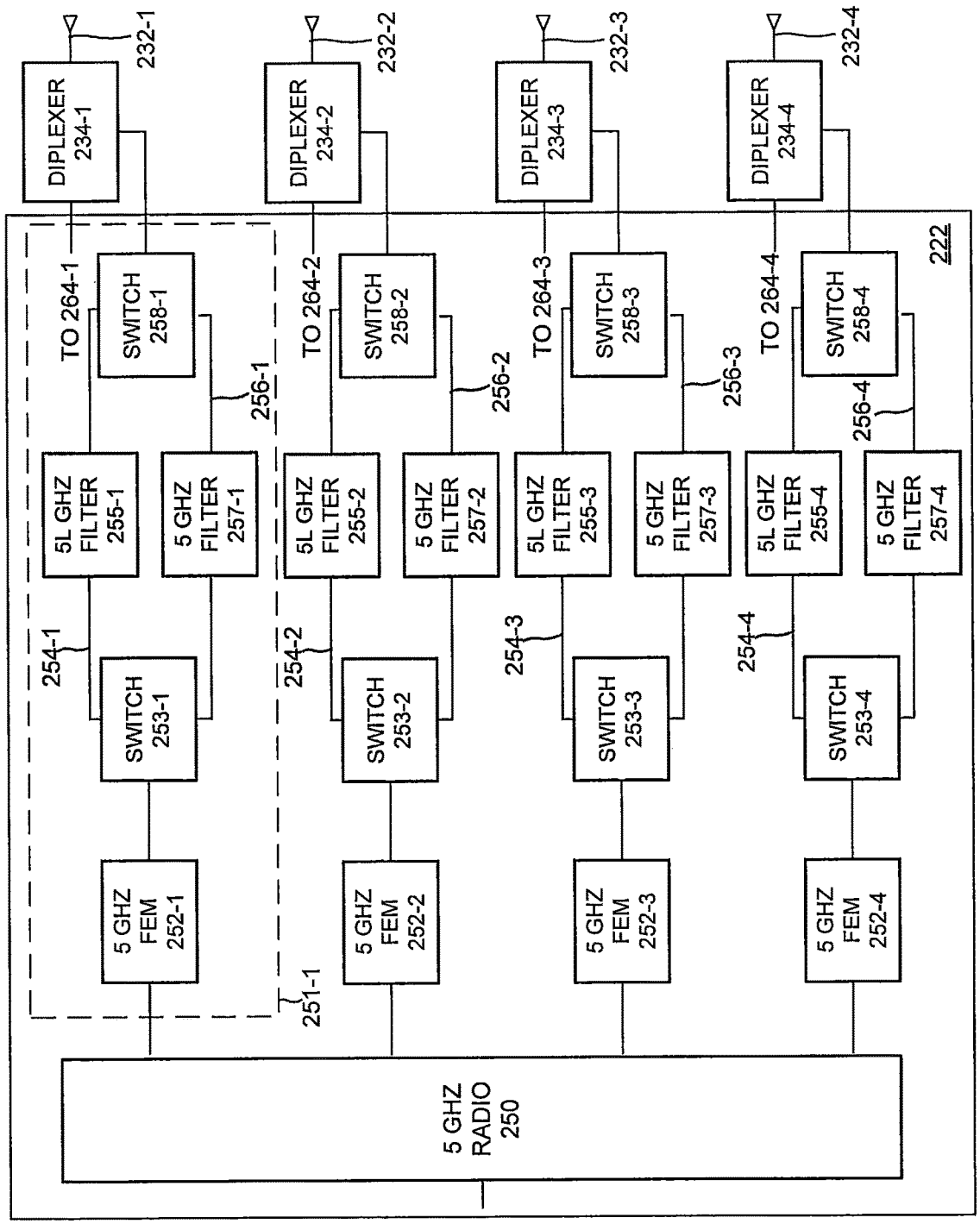
FIG. 4 is a more detailed block diagram of the 5 GHz transmit/receive circuit block of the tri-band access point of FIG. 2.
Figure 5:
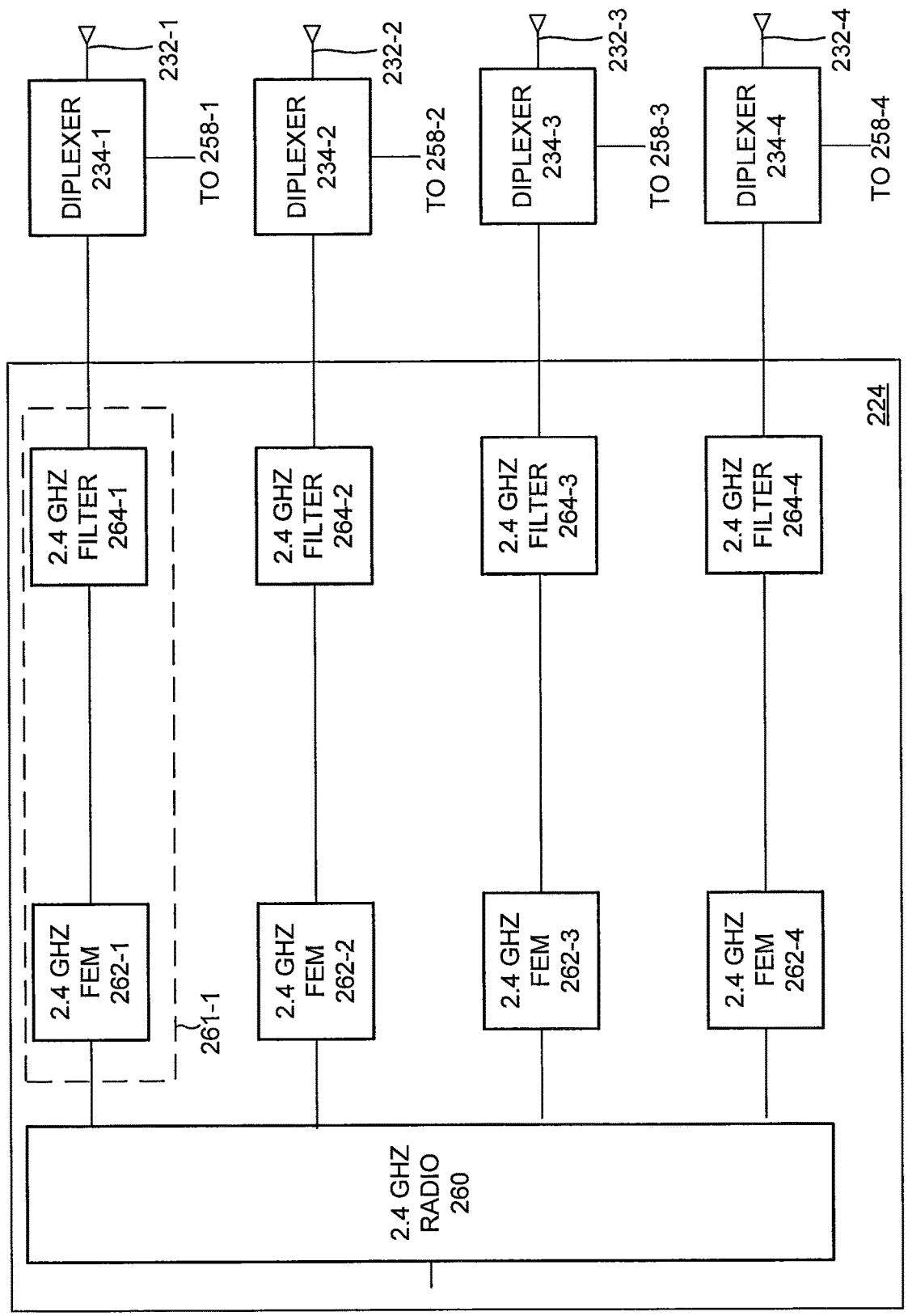
FIG. 5 is a more detailed block diagram of the 2.4 GHz transmit/receive circuit block of the tri-band access point of FIG. 2.

FIG. 2 is a block diagram of a tri-band access point 200 according to embodiments of the present invention. FIGS. 3-5 are block diagrams that illustrate the respective 2.4 GHz, 5 GHz and 5/6 GHz transmit/receive circuit blocks of the tri-band access point 200 of FIG. 2 in greater detail.

Referring first to FIG. 2, the access point 200 includes a baseband processor 210. The baseband processor may comprise, for example, a Hawkeye series WiFi chipset that is available from Qualcomm. The baseband processor 210 may also be referred to as a "WiFi chipset" herein. The baseband processor 210 may be coupled to three transmit/receive circuit blocks, namely a 5/6 GHz transmit/receive circuit block 220, a 5 GHz transmit/receive circuit block 222 and a 2.4 GHz transmit/receive circuit block 224. Each transmit/receive circuit block 220, 222, 224 may include one or more transmit/receive paths. In the depicted embodiment, each transmit/receive circuit block 220, 222, 224 includes a total of four transmit/receive paths, but more or fewer transmit/receive paths may be included in other embodiments. The respective transmit/receive circuit blocks 220, 222, 224 will be described in more detail with reference to FIGS. 3-5 below.

Four radiating elements 230-1 through 230-4 are coupled to the 5/6 GHz transmit/receive circuit block 220, with each radiating element 230 coupled to a respective one of the 5/6 GHz transmit/receive paths included in the 5/6 GHz transmit/receive circuit block 220. The radiating elements 230 may be wideband radiating elements that are configured to transmit and receive signals in both the 5 GHz and 6 GHz frequency bands. The radiating elements 230 may comprise, for example, dipole radiating elements or monopole radiating elements. The radiating elements 230 may have different configurations. For example, two of the radiating elements 230-1 through 230-4 may be horizontally polarized radiating elements while the other two radiating elements 230-1 through 230-4 may be vertically polarized radiating elements. The radiating elements 230 may be physically spaced apart from each other and/or have different polarizations in order to increase the degree of decorrelation between the radiating elements 230. This may allow improved performance when the 5/6 GHz transmit/receive paths are used to transmit and receive RF signals using multiple-input-multiple-output ("MIMO") communication techniques. As known to those of skill in the art, MIMO refers to a communication technique in which a baseband data stream is divided into multiple sub-streams, and the sub-streams are coded and simultaneously transmitted over multiple different RF channels. At the receive device, the multiple RF signals are received, demodulated and decoded, and the received sub-streams are recombined to recreate the original data stream. The use of MIMO communication techniques can significantly increase the total throughput under certain conditions. Since a total of four 5/6 GHz transmit/receive paths are provided, the 5/6 GHz transmit/receive circuit block 220 may transmit and receive signals using 4×MIMO communication techniques.

Four radiating elements 232-1 through 232-4 are also provided. The radiating elements 232 are coupled to both the 5 GHz transmit/receive circuit block 222 and to the 2.4 GHz transmit receive circuit block 224 through four diplexers 234-1 through 234-4. Each diplexer 234 comprises a three port device that has a first frequency selective port that passes RF signals in the 2.4 GHz frequency band while blocking signals in at least the 5 GHz frequency band, a second frequency selective port that passes RF signals in the 5 GHz frequency band while blocking signals in at least the 2.4 GHz frequency band, and a third "common" port that passes signals in both the 2.4 GHz and 5 GHz frequency bands. Each diplexer 234 is coupled to one of the 5 GHz transmit/receive paths 222 included in the 5 GHz transmit/receive circuit block, to one of the 2.4 GHz transmit/receive paths included in the 5 GHz transmit/receive circuit block 224, and to one of the radiating elements 232. Thus, the diplexers 234 act to combine RF signals that are passed in the "transmit" direction along respective pairs of a 5 GHz transmit/receive path and a 2.4 GHz transmit/receive path so that the combined signals may be passed to the respective radiating elements 232 and radiated into free space. For RF signals received at radiating elements 232, the diplexers 234 split the 5 GHz signals from the 2.4 GHz signals and pass the 5 GHz signals to the 5 GHz transmit/receive circuit block 222 and pass the 2.4 GHz signals to the 2.4 GHz transmit/receive circuit block 224.

The radiating elements 232 may be wideband radiating elements that are configured to transmit and receive signals in both the 5 GHz and 2.4 GHz frequency bands. The radiating elements 232 may comprise, for example, dipole radiating elements or monopole radiating elements. The radiating elements 232 may have different configurations (e.g., different polarizations and/or designs). Since a total of four 5 GHz and 2.4 GHz transmit/receive paths 222, 224 are provided, the access point 200 may also operate using 4×MIMO communication techniques in the 5 GHz frequency band and in the 2.4 GHz frequency band.

FIG. 3 is a more detailed block diagram of the 5/6 GHz transmit/receive circuit block 220 of the tri-band access point 200 of FIG. 2. As shown in FIG. 3, the 5/6 GHz transmit/receive circuit block 220 includes a four-port 5/6 GHz radio 240 that can be configured (by hardware and/or software) to communicate in either the 5 GHz or 6 GHz frequency bands. The 5/6 GHz radio 240 includes an input port that is coupled to the baseband processor 210 (FIG. 2) and four output ports. The 5/6 GHz radio 240 can simultaneously transmit or receive four separate radio frequency ("RF") signals. The four outputs of the 5/6 GHz radio 240 are coupled to four respective 5/6 GHz transmit receive paths 241. The first 5/6 GHz transmit receive path 241-1 is indicated by the dashed box in FIG. 3. The other three 5/6 GHz transmit receive paths 241 are positioned below the first 5/6 GHz transmit receive paths 241-1 and are not expressly labeled in order to simplify the figure.

Each 5/6 GHz transmit/receive path 241 includes a 1×2 switch 242. Each 1×2 switch 242 may be implemented, for example, using RF switches. The first output of each switch 242 is coupled to a respective 5 GHz communication path 243, and the second output of each switch 242 is coupled to a respective 6 GHz communication path 246. Each 5 GHz communication path 243 includes a 5 GHz front end module 244 that may include, for example, a high power amplifier that is used for transmit operations, a low noise amplifier that is used for receive operations, and a pair of switches that are used to selectively connect one of the high power amplifier or the low noise amplifier to the output of the radio 240. The design of such front end modules are well known in the art, so the individual components of the 5 GHz front end modules 244 (as well as the other front end modules included in the access points according to embodiments of the present invention) are not shown in the figures.

The output of each 5 GHz front end module 244 is connected to a respective bandpass filter 245. In the depicted embodiment, each bandpass filter 245 is configured to pass RF signals in the 5.490-5.835 GHz frequency range, which corresponds to the combination of the U-NII2C and U-NII3 frequency bands. This frequency range corresponds to the upper portion of the 5 GHz frequency band, and hence the bandpass filters 245 are labelled as "5U" GHz filters in FIG. 3 to indicate that they pass RF signals in the upper portion of the 5 GHz frequency band. The output of each bandpass filter 245 is connected to a first input of a respective 2×1 switch 249. The output of each 2×1 switch 249 is connected to a respective one of the radiating elements 230.

Each 6 GHz communication path 246 includes a 6 GHz front end module 247 that may include, for example, a high power amplifier that is used for transmit operations, a low noise amplifier that is used for receive operations, and a pair of switches that are used to selectively connect one of the high power amplifier or the low noise amplifier to the output of the radio 240. The output of each 6 GHz front end module 247 is connected to a respective bandpass filter 248. In the depicted embodiment, each bandpass filter 248 is configured to pass RF signals in the 6 GHz frequency band. The output of each bandpass filter 248 is connected to a second input of a respective one of the 2×1 switches 249.

The 5/6 GHz radio 240 may be configured to transmit and receive signals in either the 5 GHz or 6 GHz frequency band. When the 5/6 GHz radio 240 is configured to transmit and receive signals in the 5 GHz frequency band, then the switches 242, 249 are set to couple the radio 240 to the 5 GHz communication paths 243. When the 5/6 GHz radio 240 is configured to transmit and receive signals in the 6 GHz frequency band, then the switches 242, 249 are set to couple the radio 240 to the 6 GHz communication paths 246.

FIG. 4 is a more detailed block diagram of the 5 GHz transmit/receive circuit block 222 of the tri-band access point 200 of FIG. 2. As shown in FIG. 4, the 5 GHz transmit/receive circuit block 222 include a four-port 5 GHz radio 250 that includes an input port that is coupled to the baseband processor 210 (FIG. 2) and four output ports. The 5 GHz radio 250 can simultaneously transmit or receive four separate RF signals. The four outputs of the 5 GHz radio 250 are coupled to four respective 5 GHz front end modules 252. The 5 GHz front end modules 252 may be similar or identical to the 5 GHz front end modules 244 discussed above (the various front end modules may have amplifiers that are tuned to optimize performance for the specific frequency range of the RF signals that will be input to the front end module). The output of each 5 GHz front end module 252 is coupled to a respective 1×2 switch 253, which may be identical to the above-described 1×2 switches 242.

The first output of each switch 253 is coupled to a respective "5L" GHz communication path 254, and the second output of each switch 253 is coupled to a respective 5 GHz communication path 256. Each 5L GHz communication path 254 includes a respective bandpass filter 255. In the depicted embodiment, each bandpass filter 255 is configured to pass RF signals in the 5.170-5.330 GHz frequency band, which corresponds to the combination of the U-NII1 and U-NII2A frequency bands. This frequency range corresponds to the lower portion of the 5 GHz frequency band, and hence the bandpass filters 255 are labelled as "5L" GHz filters in FIG. 4 to indicate that they pass RF signals in the lower portion of the 5 GHz frequency band. The output of each bandpass filter 255 is connected to a first input of a respective 2×1 switch 258. The output of each 2×1 switch 258 is connected to a respective one of the radiating elements 232 through a respective one of the diplexers 234.

Each 5 GHz communication path 256 includes a respective bandpass filter 257. In the depicted embodiment, each bandpass filter 257 is configured to pass RF signals in the full 5 GHz frequency band. The output of each bandpass filter 257 is connected to a second input of a respective one of the 2×1 switches 258.

The 5 GHz radio 250 may be configured to transmit and receive signals in either the full 5 GHz frequency band or in only the lower portion of the 5 GHz frequency band. When the 5 GHz radio 250 is configured to transmit and receive signals in only the lower portion of the 5 GHz frequency band, then the switches 253, 258 are set to couple the radio 250 to the 5L GHz communication paths 254. When the 5 GHz radio 250 is configured to transmit and receive signals in the full 5 GHz frequency band, then the switches 253, 258 are set to couple the radio 250 to the 5 GHz communication paths 256.

FIG. 5 is a more detailed block diagram of the 2.4 GHz transmit/receive circuit block 224 of the tri-band access point 200 of FIG. 2. As shown in FIG. 5, the 2.4 GHz transmit/receive circuit block 224 include a four-port 2.4 GHz radio 260 that includes an input port that is coupled to the baseband processor 210 (FIG. 2) and four output ports. The 2.4 GHz radio 260 can simultaneously transmit or receive four separate RF signals. The four outputs of the 2.4 GHz radio 260 are coupled to four respective 2.4 GHz front end modules 262. The 2.4 GHz front end modules 262 may be similar or identical to the front end modules 244 discussed above, but include amplifiers that are tuned to optimize performance for the 2.4 GHz frequency band. The output of each 2.4 GHz front end module 262 is coupled to a respective bandpass filter 264 that is configured to pass RF signals in the 2.4 GHz frequency band. The output of each bandpass filter 264 is connected to a respective one of the radiating elements 232 through a respective one of the diplexers 234.

The access point 200 of FIGS. 2-5 may be configured to operate in two different modes. In the first mode, the access point 200 may operate in all three of the 2.4 GHz, 5 GHz and 6 GHz frequency bands. For example, the access point 200 may simultaneously support 4×MIMO communication in each of these frequency bands, since each transmit/receive circuit block 220, 222, 224 includes a total of four transmit/receive paths. The access point 200 may be configured to operate in this first mode when, for example, 6 GHz client devices are present within the coverage area of the access point 200.

In the second mode, the access point 200 may operate in only the 2.4 GHz and 5 GHz frequency bands. In particular, the 5 GHz transmit/receive paths 251 may be configured to operate in the lower portion of the 5 GHz frequency band (i.e., the 5 GHz transmit/receive paths 251 will use the 5L GHz communication paths 254), and the 5/6 GHz transmit/receive chains 220 may be configured to operate in the upper portion of the 5 GHz frequency band (i.e., the 5/6 GHz transmit/receive paths 241 will use the 5U GHz communication paths 243). As such, both radios 240 and 250 may simultaneously support communications in different portions of the 5 GHz frequency band. Moreover, since the 5 GHz frequency band is sub-divided into two smaller sub-bands, the full power of the high power and low noise amplifiers in each 5 GHz front end module 252 may be spread across only the lower portion of the 5 GHz frequency band and the full power of the high power and low noise amplifiers in each 5 GHz front end module 244 may be spread across only the upper portion of the 5 GHz frequency band. This may allow for higher transmit powers in some situations. When operating in the second mode, the access point 200 may simultaneously support 4×MIMO communication in the 2.4 GHz frequency band, the lower portion of the 5 GHz frequency band and the upper portion of the 5 GHz frequency band. The access point 200 may operate in the second mode when, for example, no 6 GHz client devices are present within the coverage area of the access point 200 or when the access point 200 is installed in a jurisdiction in which WiFi operation in the 6 GHz frequency band is not authorized. The design of access point 200 allows full use of all three radios 240, 250, 260 even when communications in the 6 GHz is not permitted or not possible due to an absence of client devices capable of operating in the 6 GHz frequency band.

Figure 6:
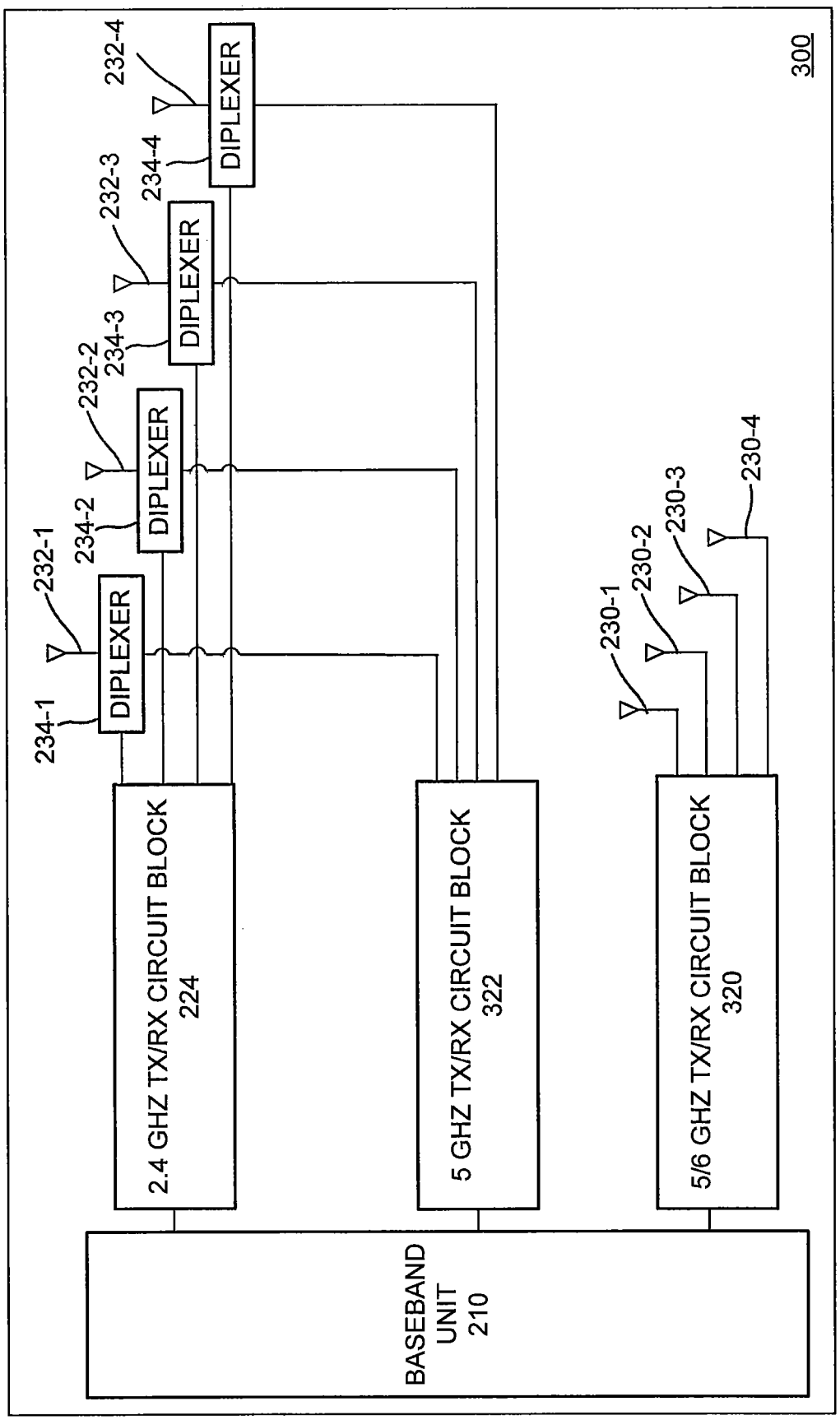
FIG. 6 is a block diagram of a tri-band access point according to further embodiments of the present invention.
Figure 7:
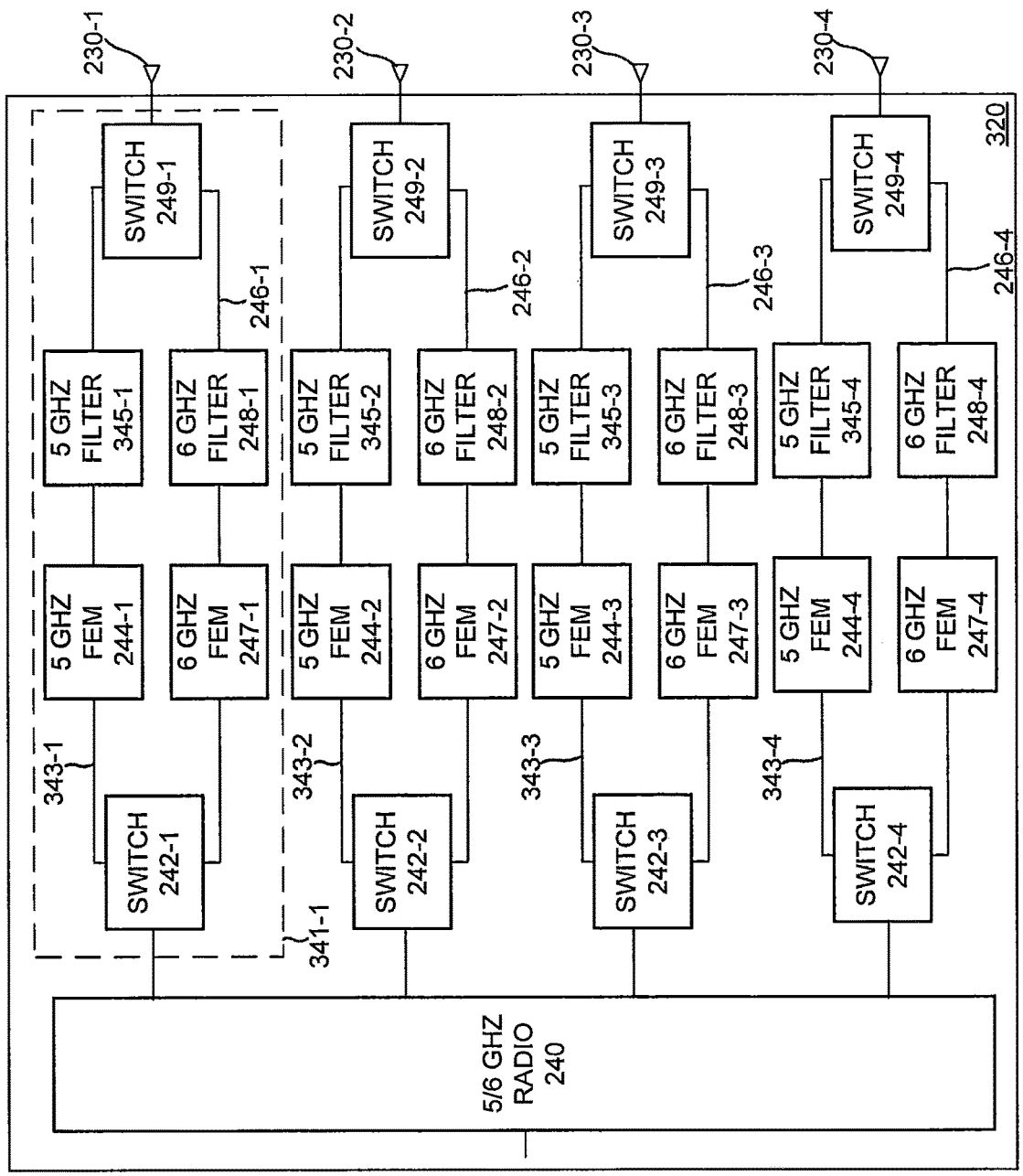
FIG. 7 is a more detailed block diagram of the 5/6 GHz transmit/receive circuit block of the tri-band access point of FIG. 6.
Figure 8:
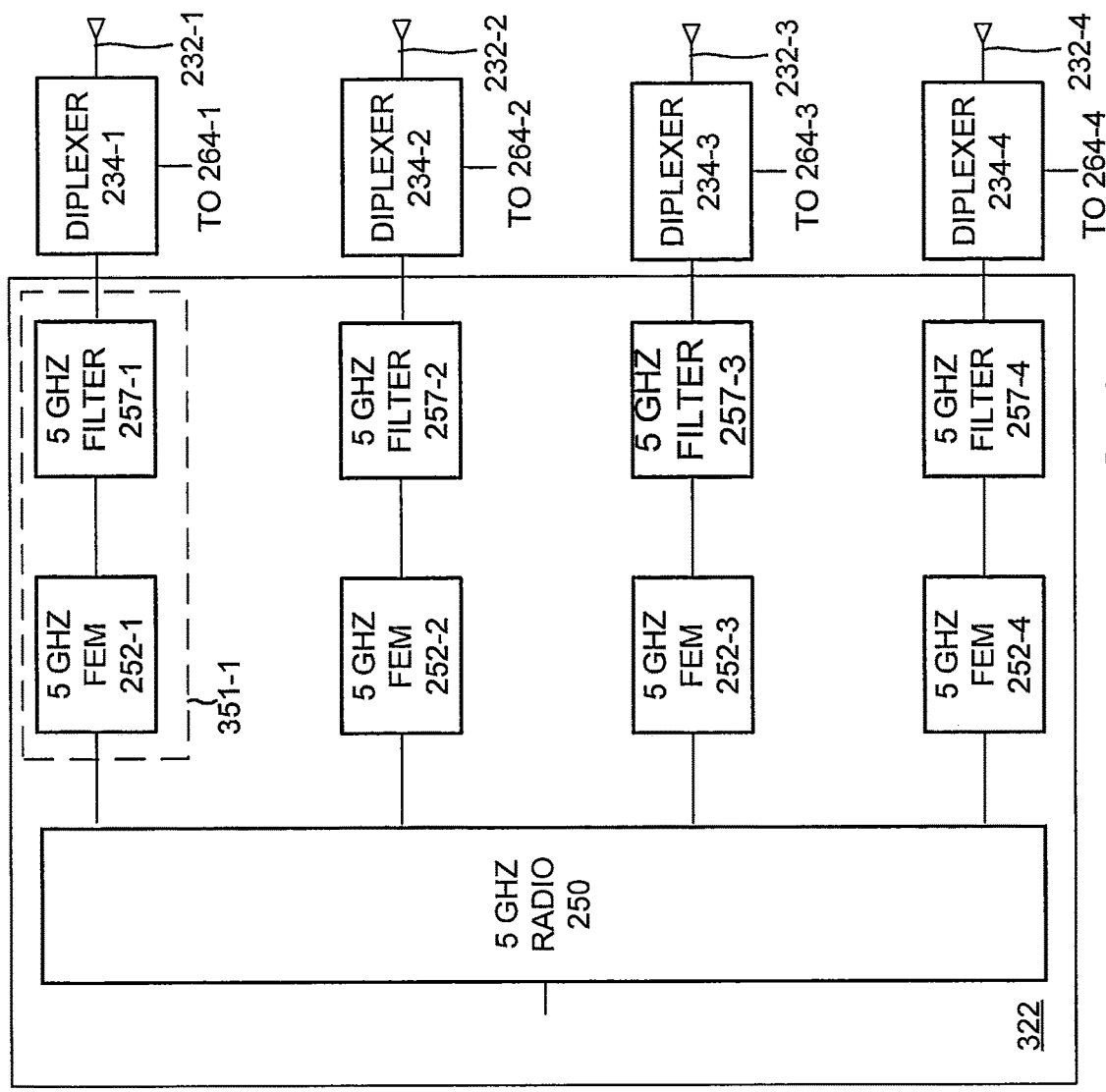
FIG. 8 is a more detailed block diagram of the 5 GHz transmit/receive circuit block of the tri-band access point of FIG. 6.

FIGS. 6-8 illustrate a tri-band access point 300 according to further embodiments of the present invention.

FIG. 6 is a block diagram of the tri-band access point 300. As can be seen, the access point 300 of FIG. 6 is very similar to the access point 200 of FIG. 2, but differs in that access point 300 has a different 5/6 GHz transmit/receive circuit block 320 and a different the 5 GHz transmit/receive circuit block 322. The designs of the 5/6 GHz and 5 GHz transmit/receive circuit blocks 320, 322 are shown in FIGS. 7 and 8. As the remainder of access point 300 may be identical to access point 200 of FIG. 2, further description of FIG. 6 will be omitted.

FIG. 7 is a more detailed block diagram of the 5/6 GHz transmit/receive paths 320 of the tri-band access point 300 of FIG. 6. As can be seen, the four 5/6 GHz transmit/receive paths 341 (only one of which is expressly labeled in FIG. 7) are similar to the four 5/6 GHz transmit/receive paths 241 of access point 200 (see FIG. 3). However, the 5L GHz bandpass filters 245 included in access point 200, which only pass RF signals in the lower portion of the 5 GHz frequency band, are replaced in access point 300 with 5 GHz bandpass filters 345 that pass RF signals within the full 5 GHz frequency band. Thus, in access point 300, each 5/6 GHz transmit/receive path 341 is configured to either pass RF signals in the full 5 GHz frequency band or RF signals in the full 6 GHz frequency band. It should be noted that the 5 GHz front end modules 244 may be optimized for operation on RF signals in the full 5 GHz frequency band in access point 300.

FIG. 8 is a more detailed block diagram of the 5 GHz transmit/receive circuit block 322 of tri-band access point 300. As can be seen, the four 5 GHz transmit/receive circuit block 322 may have a design in which a 5 GHz radio 250 feeds four 5 GHz transmit/receive paths 351 (only one of which is expressly labeled in FIG. 8), where each 5 GHz transmit receive path 351 comprises a 5 GHz front end module 252 and a 5 GHz bandpass filter 257 that are coupled in series between the 5 GHz radio 250 and a respective one of the diplexers 234.

The access point 300 of FIGS. 6-8 may be configured to operate in two different modes. The first mode may be identical to the first mode of operation of access point 200, namely in the first mode access point 300 operates in all three of the 2.4 GHz, 5 GHz and 6 GHz frequency bands. Since four transmit/receive paths 341, 351, 261 are provided for each frequency band, in the first mode access point 300 may support 4×MIMO communication in each of the 6 GHz, 5 GHz and 2.4 GHz frequency bands. The access point 300 may be configured to operate in this first mode when, for example, 6 GHz client devices are present within the coverage area of the access point 300.

In the second mode, the access point 300 may operate in only the 2.4 GHz and 5 GHz frequency bands. In the 2.4 GHz frequency band, access point 300 may support 4×MIMO communication using the four transmit/receive paths 261. In the 5 GHz frequency band, the access point 200 may have a total of eight transmit/receive paths 341, 351, as both the 5 GHz transmit/receive paths 351 and the 5/6 GHz transmit/receive paths 341 may be configured to operate in the full 5 GHz frequency band. So long as the baseband processor 210 and the radios 240 and 250 are configured to support MIMO operation across the two radios 240, 250, the access point 300 may support 8×MIMO operations at 5 GHz using the eight separate transmit/receive paths 341, 351. The radiating elements 230-1 through 230-4 and 232-1 through 232-4 are preferably configured (e.g., by their spacing and polarization) to be sufficiently decorrelated with one another to support 8×MIMO operation. In some embodiments, the functionality of the 5/6 GHz radio 240 and the 5 GHz radio 250 may be implemented in a single 5/6 GHz radio having eight output ports. The access point 300 may operate in the second mode when, for example, no 6 GHz client devices are present within the coverage area of the access point 200 or when the access point 200 is installed in a jurisdiction in which WiFi operation in the 6 GHz frequency band is not authorized. The design of access point 300 allows full use of all three radios 240, 250, 260 even when communications in the 6 GHz is not permitted or not possible due to an absence of client devices capable of operating in the 6 GHz frequency band.

Figure 9:
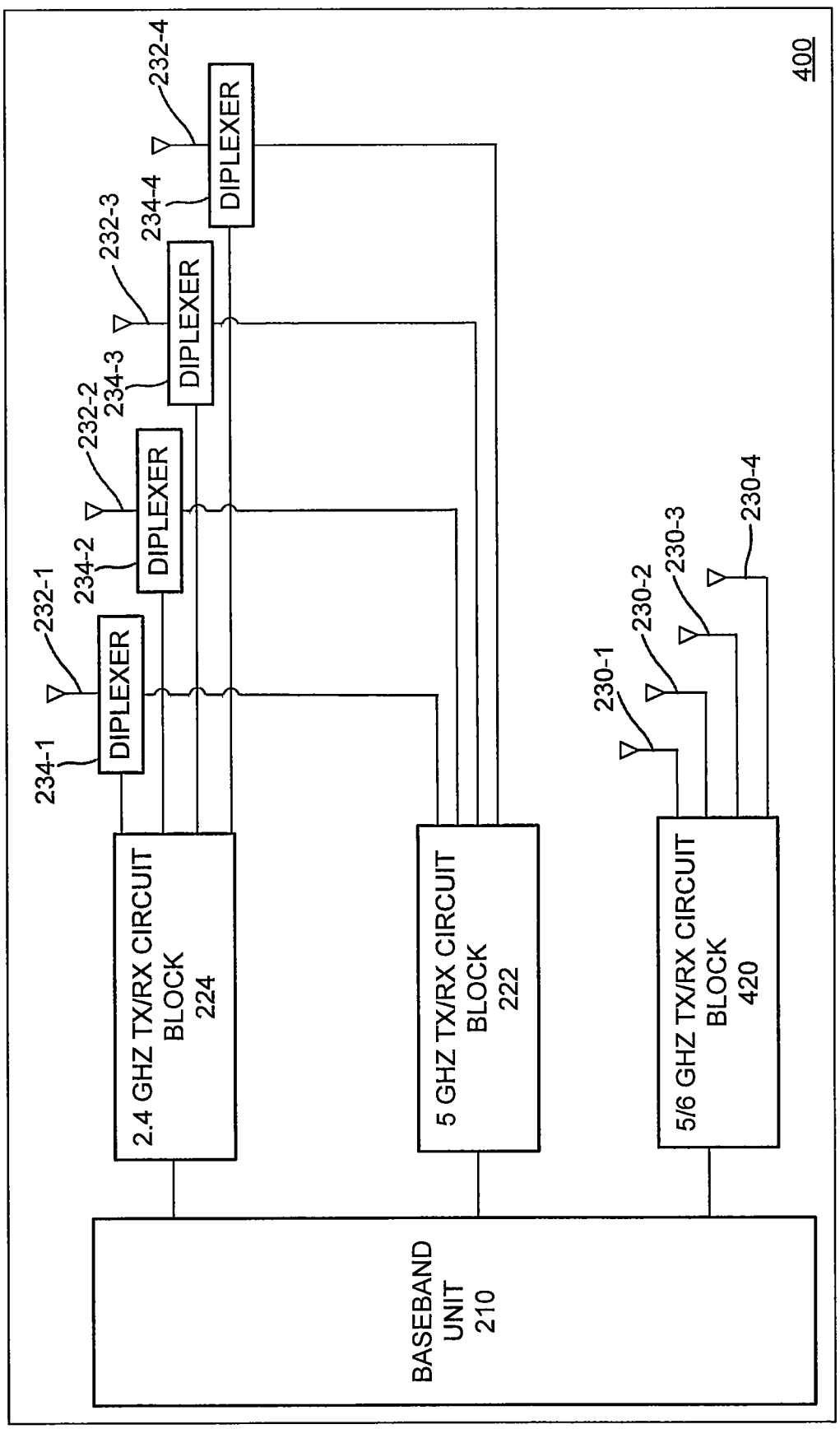
FIG. 9 is a block diagram of a tri-band access point according to still further embodiments of the present invention.

It will be appreciated that the functionality of access points 200 and 300 may be combined. FIG. 9 is a block diagram of a tri-band access point 400 according to still further embodiments of the present invention that includes the functionality of both access point 200 and access point 300. Access point 400, therefore, can operate in a total of three modes (namely the first and second modes of access point 200, as well as the second mode of access point 300).

Figure 10:
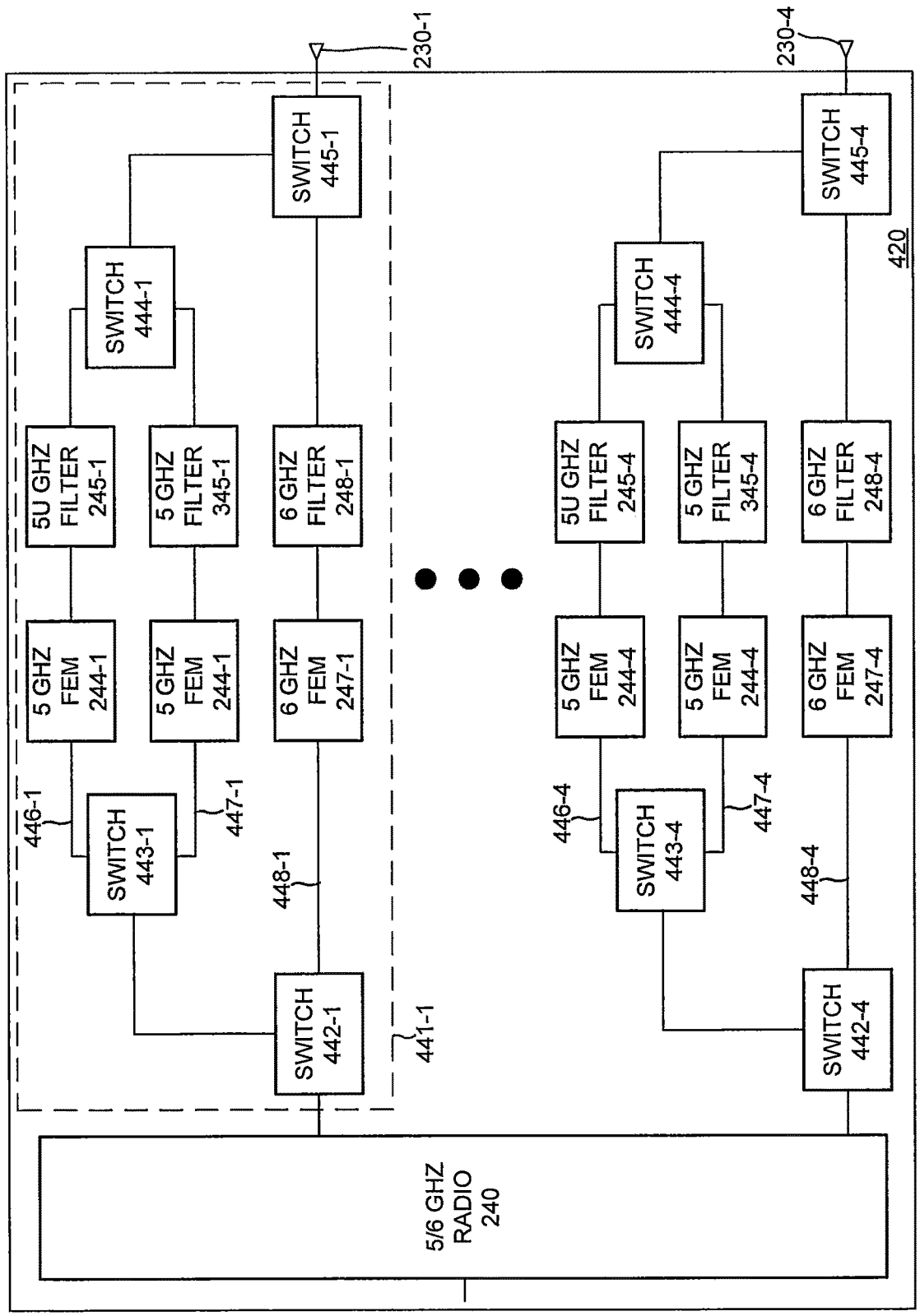
FIG. 10 is a more detailed block diagram of the 5/6 GHz transmit/receive circuit block of the tri-band access point of FIG. 9.

As shown in FIG. 9, access point 400 is identical to access point of FIG. 2 except that it has a different design for the 5/6 GHz transmit/receive circuit block 420. The design of the 5/6 GHz transmit/receive circuit block 420 is shown in FIG. 10. As the remainder of access point 400 may be identical to access point 200 of FIGS. 2-5, further description of FIG. 9 will be omitted Referring to FIG. 10, the 5/6 GHz transmit/receive circuit block 420 includes the above-described 5/6 GHz radio 240 and four 5/6 GHz transmit/receive paths 441. Only two of the four 5/6 GHz transmit/receive paths 441 are shown in FIG. 10 to simplify the drawing. As shown in FIG. 10, each 5/6 GHz transmit/receive path 441 includes three communication paths, namely a 5U GHz communication path 446, a full 5 GHz communication path 447, and a 6 GHz communication path 448. Four 1×2 switches 442-445 are used to route RF signals between the radio 240 and one of the three communication paths 446-448. The front end modules and bandpass filters included on the three communication paths 446-448 have already been described above and hence further description thereof will be omitted herein.

When the 5/6 GHz transmit/receive circuit block 420 is configured to route signals along communication path 448, the access point 400 may operate in the first mode described above with reference to access point 200 (i.e., the access point may communicate using 4×MIMO in each of the 2.4 GHz, 5 GHz and 6 GHz frequency bands). When the 5/6 GHz transmit/receive circuit block 420 is configured to route signals along communication path 446, the access point 400 may operate in the second mode described above with reference to access point 200 (i.e., the access point may communicate using 4×MIMO in each of the 2.4 GHz, 5L GHz and 5U GHz frequency bands). When the 5/6 GHz transmit/receive circuit block 420 is configured to route signals along communication path 447, the access point 400 may operate in the second mode described above with reference to access point 300 (i.e., the access point may communicate using 4×MIMO in the 2.4 GHz frequency band and using 8×MIMO in the 5 GHz frequency band).

Figure 11:
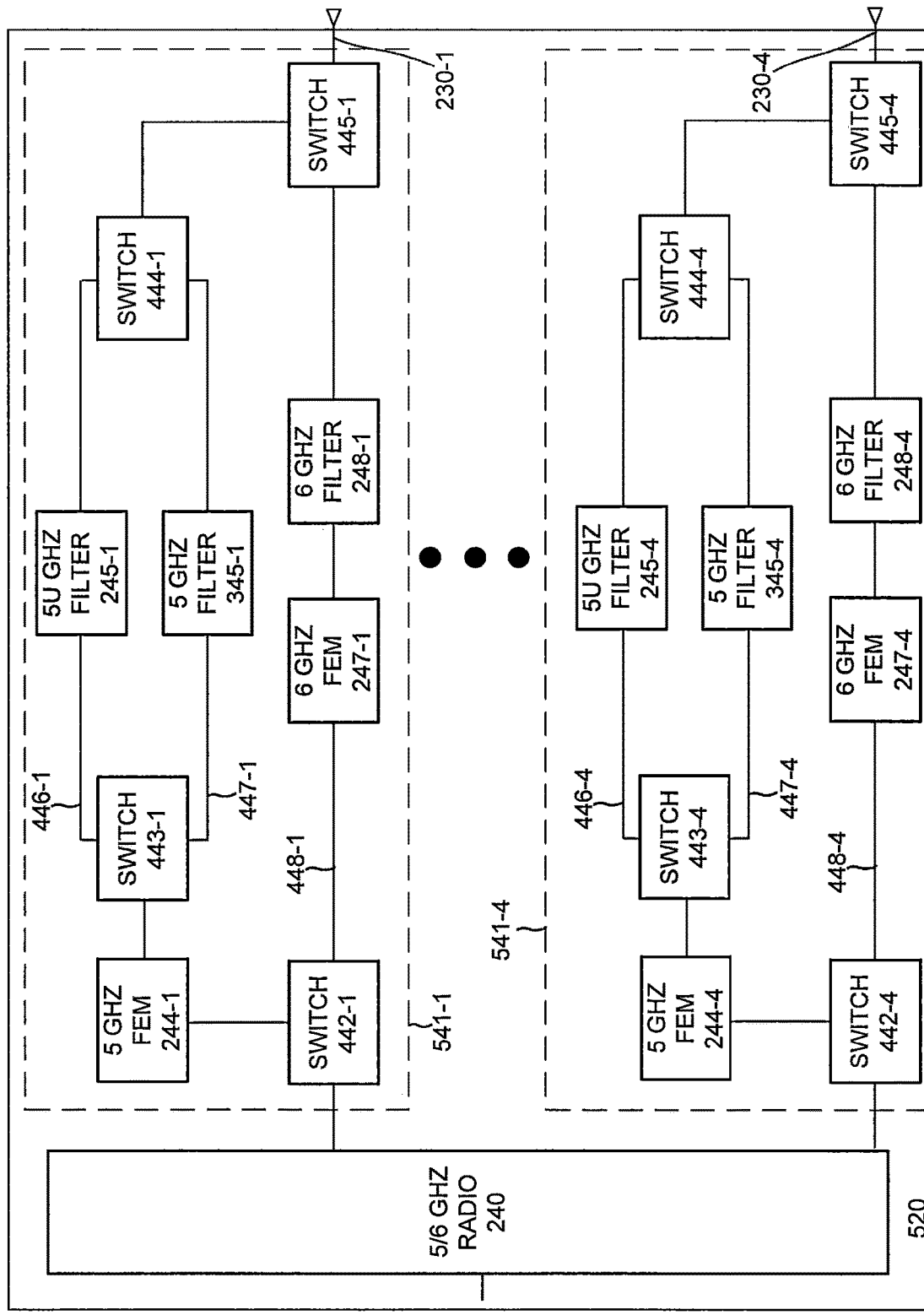
FIG. 11 is a block diagram of an alternative 5/6 GHz transmit/receive circuit block that can be used in the tri-band access point of FIG. 9.

FIG. 11 is a block diagram of a transmit/receive circuit block 520 that can be used in place of the transmit/receive chain 420 of FIG. 10 in access point 400 of FIG. 9. The transmit/receive circuit block 520 is very similar to the transmit/receive circuit block 420 of FIG. 10, with the one difference being that in each 5/6 GHz transmit/receive path 541 one of the 5 GHz front end modules 244 is moved before switch 443 (i.e., closer to radio 240), which allows elimination of the second 5 GHz front end module 244 along each 5 GHz transmit/receive path 541.

When the access points according to embodiments of the present invention are configured to split the 5 GHz frequency band into upper and lower portions that are associated with the respective 5 GHz and 5/6 GHz radios, there may be challenges with maintaining sufficient isolation between the lower 5 GHz and upper 5 GHz communication paths, particularly because RF energy can potentially leak through the switches along communication path 256 in the 5 GHz transmit/receive circuit block 222. Such leakage may degrade performance of the access point. For example, if the 5 GHz radio 250 is transmitting while the 5/6 GHz radio 240 is receiving, the performance of the 5/6 GHz radio 240 would be lower than would be the case if the 5 GHz radio 250 was not operating, due to the poor isolation.

Figure 12:
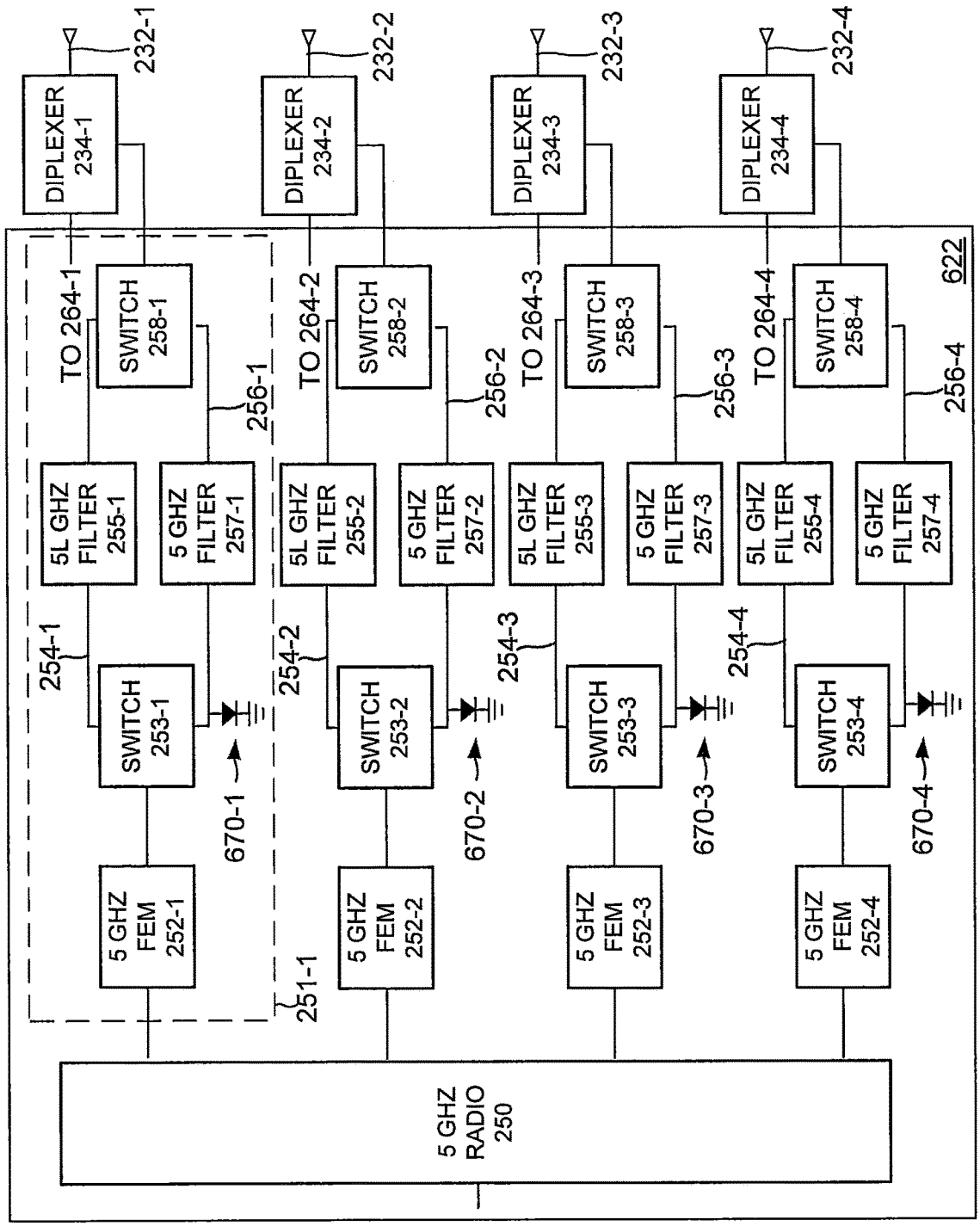
FIG. 12 is a block diagram of another embodiment of a 5 GHz transmit/receive circuit block that may be used in place of the 5 GHz transmit/receive circuit block of FIG. 4.

Pursuant to further embodiments of the present invention, the access points may include isolation circuits that increase the degree of isolation between the 5L GHz and 5U GHz communication paths 254, 256 in the 5/6 GHz transmit/receive circuit block. FIG. 12 is a block diagram of a 5 GHz transmit/receive circuit block 522 that may be used in place of the 5 GHz transmit/receive circuit block 222 of FIG. 4 that includes such an isolation circuit.

As shown in FIG. 12, the 5 GHz transmit/receive circuit block 622 may be identical to the 5 GHz transmit/receive circuit block 222 of FIG. 4 except that the 5 GHz transmit/receive circuit block 622 further includes an isolation circuit 670 along each 5 GHz transmit/receive path 251. In some embodiments, the isolation circuit 670 may be a software controlled circuit. One simple implementation of the isolation circuit 670 is a PIN diode that is coupled to ground and controlled by a software-generated control signal. When an access point that includes the 5 GHz transmit/receive circuit block 622 is operated to communicate in the 2.4 GHz, 5L GHz and 5U GHz frequency bands, the isolation circuit 670 may be activated by biasing the PIN diode 670 to turn on (e.g., using a DC bias signal) so that communication path 256 is coupled to ground. This may shunt to ground any RF energy that leaks through switch 253. When an access point that includes the 5 GHz transmit/receive circuit block 622 is operated to communicate in the 2.4 GHz and the full 5 GHz frequency bands (and perhaps the 6 GHz frequency band as well), then the PIN diode 670 may be turned off and the isolation circuit 670 will not impact operation. As shown in FIG. 12, the isolation circuit 670 may be placed between the switches 253 and the 5 GHz filters 257 on each communication path 256.

Figure 13:
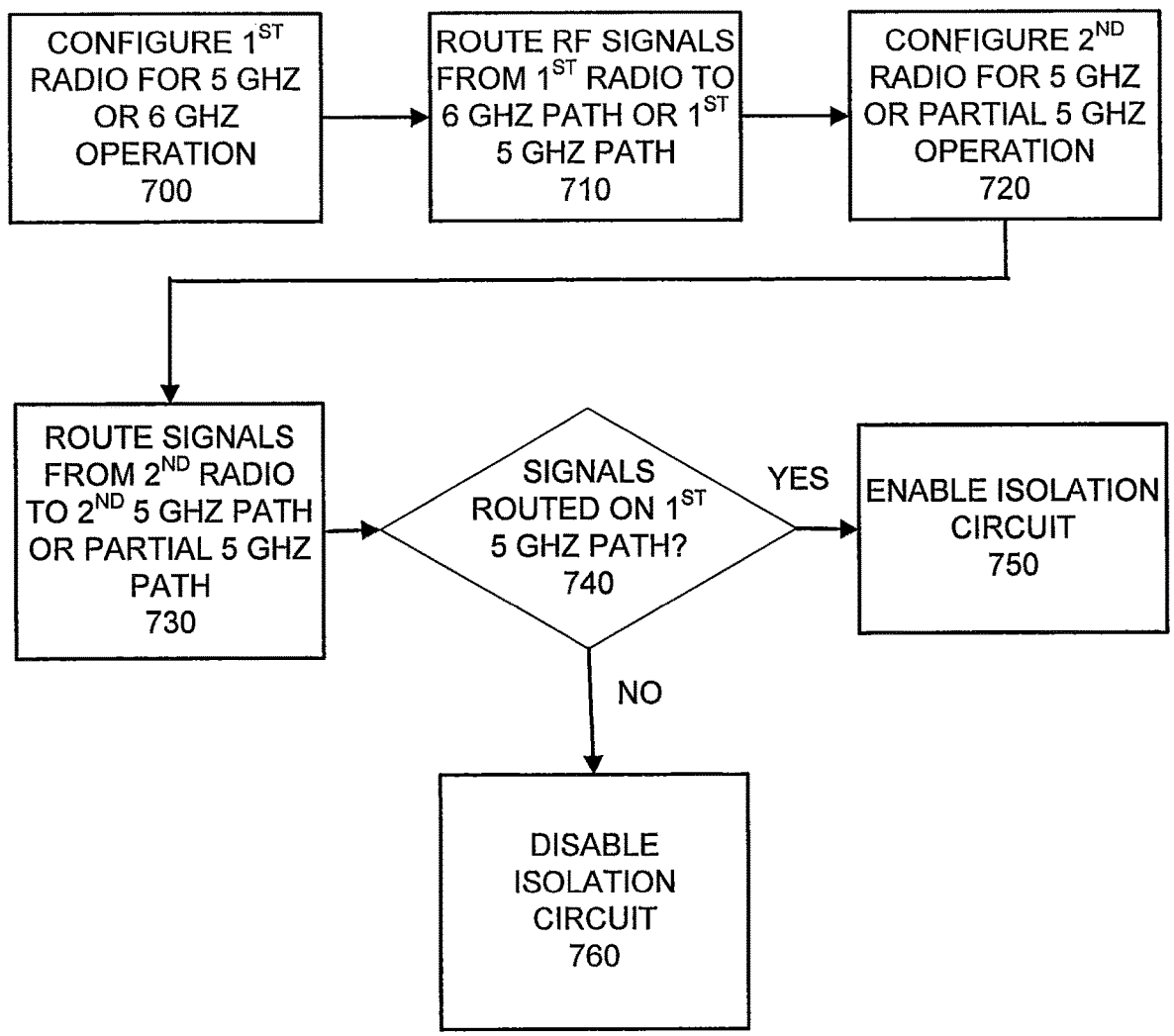
FIG. 13 is a flow chart illustrating a method of operating an access point according to embodiments of the present invention.

FIG. 13 is a flow chart illustrating a method of operating an access point having at least first and second radios and first and second radiating elements according to embodiments of the present invention.

As shown in FIG. 13, operations may begin with the first radio being selectively configured to operate in either the 5 GHz frequency band or the 6 GHz frequency band (Block 700). RF signals from the first radio may then be selectively routed from the first radio to the first radiating element through either a first 5 GHz transmit/receive path or a 6 GHz transmit/receive path based on the configuration of the first radio (block 710). The second radio may likewise be selectively configured (either before, after or at the same time that the first radio is configured) to operate in either the full 5 GHz frequency band or a first sub-band of the 5 GHz frequency band that encompasses less than all of the full 5 GHz frequency band (block 720). RF signals from the second radio are then selectively routed to the second radiating element through either a second 5 GHz transmit/receive path or a partial 5 GHz transmit/receive path based on the configuration of the second radio (block 730).

The 6 GHz transmit/receive path may include a first bandpass filter that is configured to pass RF signals in the 6 GHz frequency band and the first 5 GHz transmit/receive path may include second bandpass filter that is configured to pass RF signals in a first sub-band of the 5 GHz frequency band that encompasses less than all of the full 5 GHz frequency band. The second 5 GHz transmit/receive path may include a third bandpass filter that is configured to pass RF signals in the full 5 GHz frequency band and the partial 5 GHz transmit/receive path may include a fourth bandpass filter that is configured to pass RF signals in a second sub-band of the 5 GHz frequency band that encompasses less than all of the full 5 GHz frequency band and does not overlap with the second sub-band of the 5 GHz frequency band.

The access point may further include an isolation circuit that is, for example, coupled along the second 5 GHz transmit/receive path. A determination may be made as to whether or not the RF signals from the first radio are routed along the first 5 GHz transmit/receive path (block 740). If so, then the isolation circuit may be enabled (block 750). If not, the isolation circuit may be disabled (block 760).

It will be appreciated that many modifications may be made to the above example embodiments with departing from the scope of the present invention. As one example, the 5/6 GHz transmit/receive circuit block 420 of FIGS. 10 and 11 includes four 1×2 switches. In other embodiments, the four 1×2 switches can be replaced with two 1×3 switches. As another example, some or all of the switches included in the above-described access points may be replaced with circulators in other embodiments.

As yet another example, the access points may share the radiating elements 230 between the 5 GHz and 5/6 GHz transmit/receive circuit blocks (using diplexers) instead of sharing the radiating elements 232 between the 2.4 GHz and 5 GHz transmit/receive circuit blocks as is shown in the depicted embodiments. As yet another example, in the embodiments described above, the 5 GHz transmit/receive circuit blocks include a 5L GHz communication path and a 5 GHz communication path, while the 5/6 GHz transmit/receive circuit blocks include a 5U GHz communication path and a 6 GHz communication path. The 5L GHz communication path and the 5U GHz communication path can be switched in other embodiments so that the 5 GHz transmit/receive circuit blocks include a 5U GHz communication path and a 5 GHz communication path, while the 5/6 GHz transmit/receive circuit blocks include a 5L GHz communication path and a 6 GHz communication path. These embodiments may achieve improved filtering since the 5/6 GHz transmit/receive block will include bandpass filters that are more widely separated in frequency.

Figure 14:
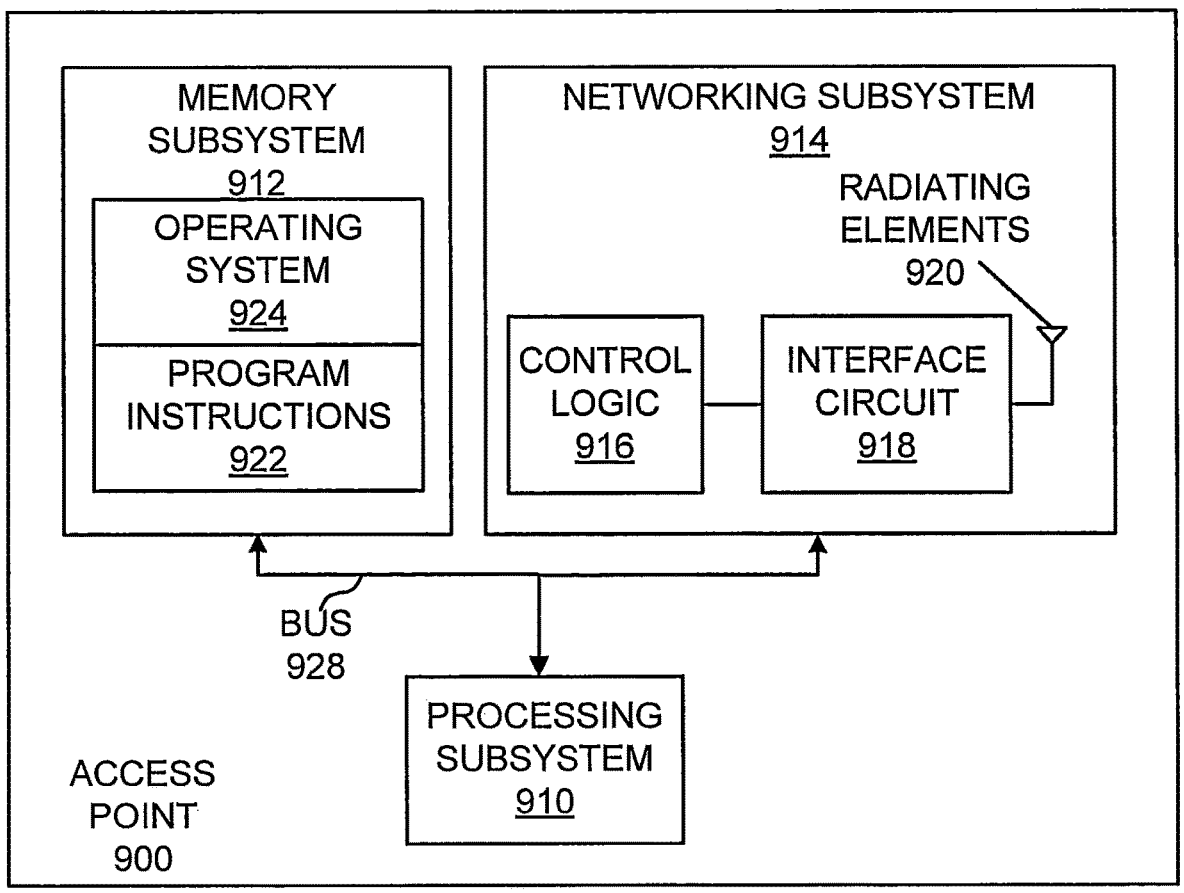
FIG. 14 is a block diagram of an access point according to embodiments of the present invention.

FIG. 14 is a block diagram illustrating an access point 900 in accordance with some embodiments. The access point 900 includes a processing subsystem 910, a memory subsystem 912, and a networking subsystem 914. Processing subsystem 910 includes one or more devices configured to perform computational operations. Memory subsystem 912 includes one or more devices for storing data and/or instructions. In some embodiments, the instructions may include an operating system and one or more program modules which may be executed by processing subsystem 910.

Networking subsystem 914 includes one or more devices configured to couple to and communicate on a wired and/or wireless network (i.e., to perform network operations), including: control logic 916, an interface circuit 918 and one or more radiating elements 920. Thus, electronic device 900 may or may not include the one or more radiating elements 920. Networking subsystem 914 includes at least a networking system based on the standards described in IEEE 802.11 (e.g., a Wi-Fi networking system).

Networking subsystem 914 includes processors, controllers, radios/radiating elements, sockets/plugs, and/or other devices used for coupling to, communicating on, and handling data and events for each supported networking system. Note that mechanisms used for coupling to, communicating on, and handling data and events on the network for each network system are sometimes collectively referred to as a "network interface" for the network system. Access point 900 may use the mechanisms in networking subsystem 914 for performing simple wireless communication, e.g., transmitting frames and/or scanning for frames transmitted by other electronic devices.

Processing subsystem 910, memory subsystem 912, and networking subsystem 914 are coupled together using bus 928. Bus 928 may include an electrical, optical, and/or electro-optical connection that the subsystems can use to communicate commands and data among one another.

The operations performed in the communication techniques according to embodiments of the present invention may be implemented in hardware or software, and in a wide variety of configurations and architectures. For example, at least some of the operations in the communication techniques may be implemented using program instructions 922, operating system 924 (such as a driver for interface circuit 918) or in firmware in interface circuit 918. Alternatively or additionally, at least some of the operations in the communication techniques may be implemented in a physical layer, such as hardware in interface circuit 918.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. An access point, comprising:
   a WiFi chipset;
   a first radio that is coupled to the WiFi chipset and that is selectively coupled to a first radiating element through one of a first filter or a second filter; and
   a second radio that is coupled between the WiFi chipset and a second radiating element,
   wherein the first radio is capable of operating in at least a first portion of the 5 GHz frequency band and in the 6 GHz frequency band, and the second radio is capable of operating in the 5 GHz frequency band, and
   wherein the first filter comprises a first bandpass filter that is configured to pass radio frequency ("RF") signals in the 6 GHz frequency band and the second filter comprises a second bandpass filter that is configured to pass RF signals in a first sub-band of the 5 GHz frequency band that encompasses less than all of the 5 GHz frequency band.

2. The access point of claim 1, wherein the second radio is selectively coupled to the second radiating element through one of a third filter or a fourth filter.

3. The access point of claim 2, wherein the third filter comprises a third bandpass filter that is configured to pass RF signals in the full 5 GHz frequency band and the fourth filter comprises a fourth bandpass filter that is configured to pass RF signals in a second sub-band of the 5 GHz frequency band that encompasses less than all of the full 5 GHz frequency band.

4. The access point of claim 3, wherein the first sub-band of the 5 GHz frequency band does not overlap with the second sub-band of the 5 GHz frequency band.

5. The access point of claim 4, and wherein the first and second sub-bands of the 5 GHz frequency band encompass the complete portion of the 5 GHz frequency band that is usable for WiFi communications.

6. The access point of claim 3, wherein a first switch is interposed between the first radio and the first and second filters and a second switch is interposed between the first and second filters and the first radiating element.

7. The access point of claim 6, wherein a third switch is interposed between the second radio and the third and fourth filters and a fourth switch is interposed between the third and fourth filters and the second radiating element.

8. The access point of claim 1, further comprising a third radio that is configured to operate in the 2.4 GHz frequency band, wherein the second radio and the third radio are coupled to the second radiating element via a diplexer.

9. The access point of claim 1, further comprising an isolation circuit coupled along a communication path that extends between the second radio and the second radiating element.

10. The access point of claim 9, wherein the isolation circuit is disabled when the access point is configured to pass RF signals from the first radio to the first radiating element over a communication path that includes the first bandpass filter.

11. The access point of claim 9, wherein the isolation circuit comprises a PIN diode that is configured to be selectively coupled to ground.

12. The access point of claim 9, wherein the isolation circuit is enabled only when the access point is configured to pass RF signals from the first radio to the first radiating element over a communication path that includes the second bandpass filter.

13. The access point of claim 9, wherein the second radio is selectively coupled to the second radiating element through a first communication path that includes a third bandpass filter that is configured to pass RF signals in the full 5 GHz frequency band or through a second communication path that includes a fourth bandpass filter that is configured to pass RF signals in a sub-band of the 5 GHz frequency band that encompasses less than all of the full 5 GHz frequency band, and wherein the isolation circuit is coupled along the second communication path.

14. The access point of claim 1, wherein a first switch is interposed between the first radio and the first and second filters and a second switch is interposed between the first and second filters and the first radiating element.

15. An access point, comprising:
   a WiFi chipset;
   a first radio that is coupled to the WiFi chipset and that is selectively coupled to a first radiating element through one of a first filter or a second filter; and
   a second radio that is coupled between the WiFi chipset and a second radiating element,
   wherein the first radio is capable of operating in at least a first portion of the 5 GHz frequency band and in the 6 GHz frequency band, and the second radio is capable of operating in the 5 GHz frequency band, and
   wherein the first radio is configured to operate in either the full 5 GHz frequency band or the full 6 GHz frequency band, the second radio is configured to operate in the full 5 GHz frequency band, the first filter comprises a first bandpass filter that is configured to pass radio frequency ("RF") signals in the full 6 GHz frequency band and the second filter comprises a bandpass filter that is configured to pass RF signals in the full 5 GHz frequency band.

16. The access point of claim 15, wherein the access point is configured to operate with N multi-input-multi-output ("MIMO") transmit/receive paths in the 5 GHz frequency band when the access point is supporting communications in the 6 GHz frequency band, and is configured to operate with 2*N MIMO transmit/receive paths in the 5 GHz frequency band when the access point is not supporting communications in the 6 GHz frequency band, where N is a natural number.

17. The access point of claim 15, wherein the access point is configured to use both the first radio and the second radio to communicate using multi-input-multi-output ("MIMO") communications techniques in the 5 GHz frequency band when the access point is not supporting communications in the 6 GHz frequency band.

* * * * *